US012170409B2

(12) United States Patent
Pepin et al.

(10) Patent No.: US 12,170,409 B2
(45) Date of Patent: Dec. 17, 2024

(54) CROSS-COUPLING MODELING AND COMPENSATION FOR ANTENNA APPARATUS

(71) Applicant: Space Exploration Technologies Corp., Hawthorne, CA (US)

(72) Inventors: Eric Pepin, Seattle, WA (US); Kim W. Schulze, Seattle, WA (US); Ersin Yetisir, Redmond, WA (US); Javier Rodriguez De Luis, Kirkland, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 18/091,995

(22) Filed: Dec. 30, 2022

(65) Prior Publication Data

US 2023/0134123 A1 May 4, 2023

Related U.S. Application Data

(63) Continuation of application No. 17/149,496, filed on Jan. 14, 2021, now Pat. No. 11,563,270.

(51) Int. Cl.
*H01Q 3/30* (2006.01)

(52) U.S. Cl.
CPC .................................... *H01Q 3/30* (2013.01)

(58) Field of Classification Search
CPC ........................................................ H01Q 3/30
USPC .......................... 307/104; 342/175, 369, 373
See application file for complete search history.

(56) References Cited

U.S. PATENT DOCUMENTS 8,786,437 B2 7/2014 Breed
9,443,358 B2 9/2016 Breed
2016/0126753 A1 * 5/2016 Wight .................... H02J 50/90 307/104

* cited by examiner

*Primary Examiner* — Bo Fan
(74) *Attorney, Agent, or Firm* — Polsinelli PC

(57) ABSTRACT

Systems, methods, and non-transitory media are provided for cross-coupling modeling and compensation. An example method can include determining one or more cross-coupling coefficients representing electrical cross-coupling between a first signal path through a component and a second signal path through the component; based on the one or more cross-coupling coefficients, determining a first modified beamforming weight for a first signal associated with the first signal path through the component and a second modified beamforming weight for a second signal associated with the second signal path through the component, wherein the first and second modified beamforming weights compensate for the electrical cross-coupling between the first signal path through the component and the second signal path through the component; applying the first modified beamforming weight to the first signal associated with the first signal path; and applying the second modified beamforming weight to the second signal associated with the second signal path.

22 Claims, 18 Drawing Sheets

CROSS-COUPLING MODELING AND COMPENSATION FOR ANTENNA APPARATUS

CROSS-REFERENCES TO RELATED APPLICATIONS

The present application is a continuation of U.S. application Ser. No. 17/149,496, filed Jan. 14, 2021 entitled "CROSS-COUPLING MODELING AND COMPENSATION FOR ANTENNA APPARATUS," the contents of which is hereby expressly incorporated by reference herein in its entirety.

TECHNICAL FIELD

The present disclosure generally relates to wireless communications systems and, more specifically, cross-coupling modeling and compensation for phased array antennas.

BACKGROUND

Phased array antennas are widely used in a variety of wireless communication systems such as satellite and cellular communication systems. Phased array antennas can include a number of antenna elements arranged to behave as a larger directional antenna. Advantageously, a phased array antenna can transmit or receive signals in a preferred direction (e.g., via beamforming) without physically repositioning or reorientation. However, phased array antennas can experience cross-coupling or cross-talk between antenna elements and circuitry along the signal paths. Such cross-coupling or cross-talk can have undesirable effects and can negatively impact the performance of a phased array antenna. For example, cross-coupling or cross-talk can cause interference, signal phase shifts, harmonic distortion, signal integrity losses, distortion of radiation patterns, among other issues. Accordingly, there is a need in the art for technologies and strategies to reduce, manage, and/or limit cross-coupling in phased array antennas and improve phased array antenna performance.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1A:
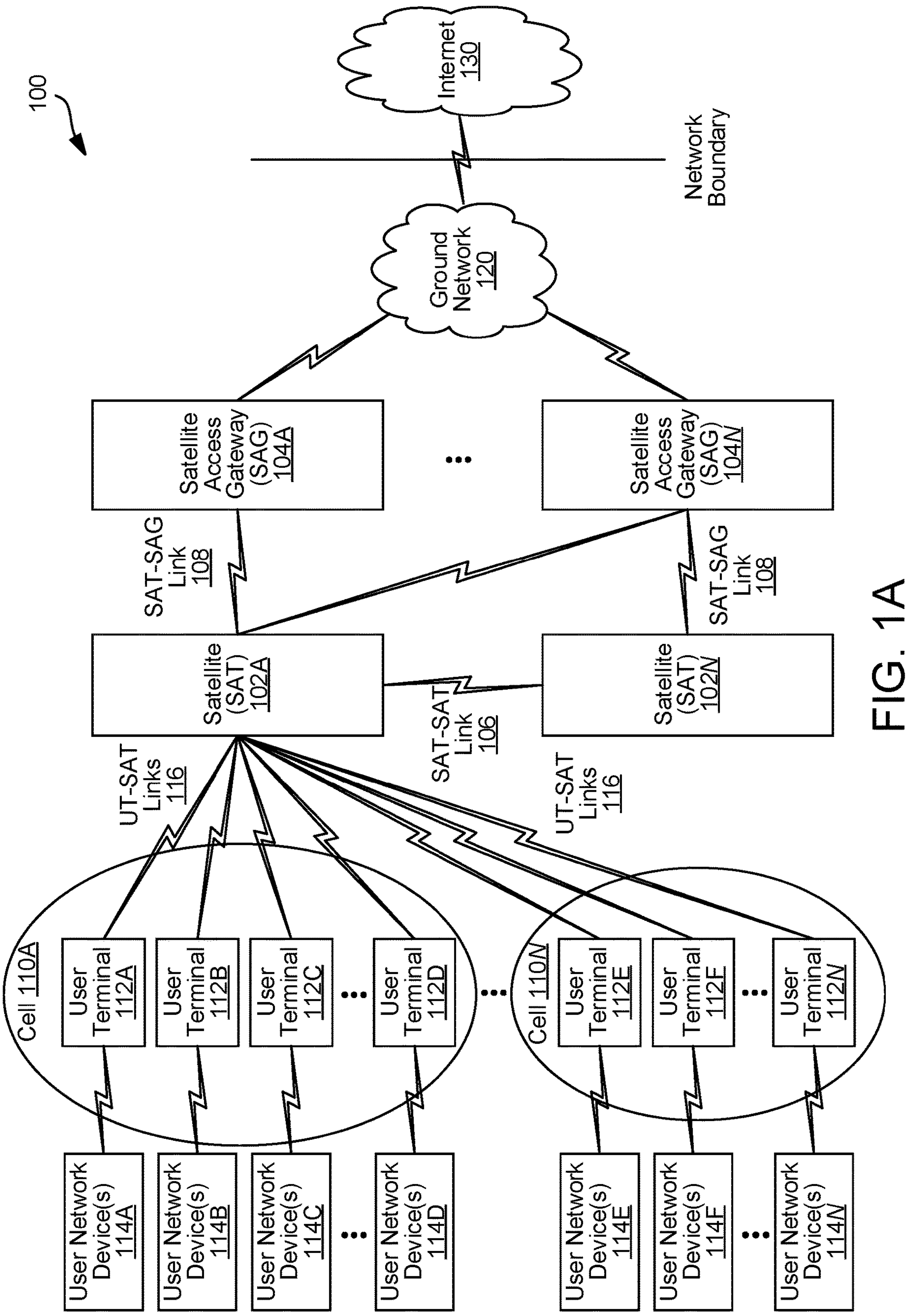
FIG. 1A is a simplified diagram illustrating an example wireless communication system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously mentioned, a phased array antenna can include a number of antenna elements arranged to behave as a larger directional antenna, and can transmit and/or receive signals in a preferred direction (e.g., via beamforming) without physically repositioning or reorientation. However, phased array antennas can experience cross-coupling or cross-talk between antenna elements and circuitry along the signal paths. For example, in some cases, a phased array antenna can include a multiple-input, multiple-output (MIMO) frontend that interfaces with multiple antenna elements in the phased array antenna. The MIMO frontend can experience electrical cross-coupling, which can produce undesired antenna radiation pattern effects. In some examples, the electrical cross-coupling can produce concentrated and/or high peak sidelobe power (e.g., grating lobes) which can cause interference at the MIMO frontend, other components in the phased array antenna, as well as other devices communicating with the phased array antenna, such as satellites communicating with the phased array antenna.

Disclosed herein are systems, methods, and computer-readable media for cross-coupling modeling and compensation for phased array antennas. In some examples, the disclosed technologies can estimate and/or measure the input and output electrical coupling parameters of a MIMO frontend of a phased array antenna before or after the frontend is placed on the phased array antenna. The electrical coupling parameters can be used to pre-compensate beamforming weights calculated for individual elements in the phased array antenna to mitigate and/or cancel the electrical cross-coupling within the frontend of the phased array antenna. The pre-compensated beamforming weights can be applied by a beamformer to the input or output signals (e.g., input signals when transmitting and output signals when receiving) of the frontend to mitigate and/or cancel the electrical cross-coupling within the frontend, reduce or eliminate undesired grating lobes associated with the cross-coupling within the frontend, and/or reduce or eliminate other electrical cross-coupling effects.

In some examples, cross-coupling within the frontend can be canceled and/or mitigated without implementing separate hardware and/or hardware modifications to the transceiver and/or beamforming system of the phased array antenna. Moreover, in some cases, the techniques described herein can be implemented for mitigating and/or canceling cross-coupling within other components along the signal path such as, for example and without limitation, a multi-channel buffer placed between a digital and analog beamformer in a hybrid beamforming architecture, and/or any other components in the phased array antenna. Further, the techniques described herein can be implemented in single or multiple beam phased array systems, and/or antennas operating with or without time-domain duplexing (TDD).

Figure 8:
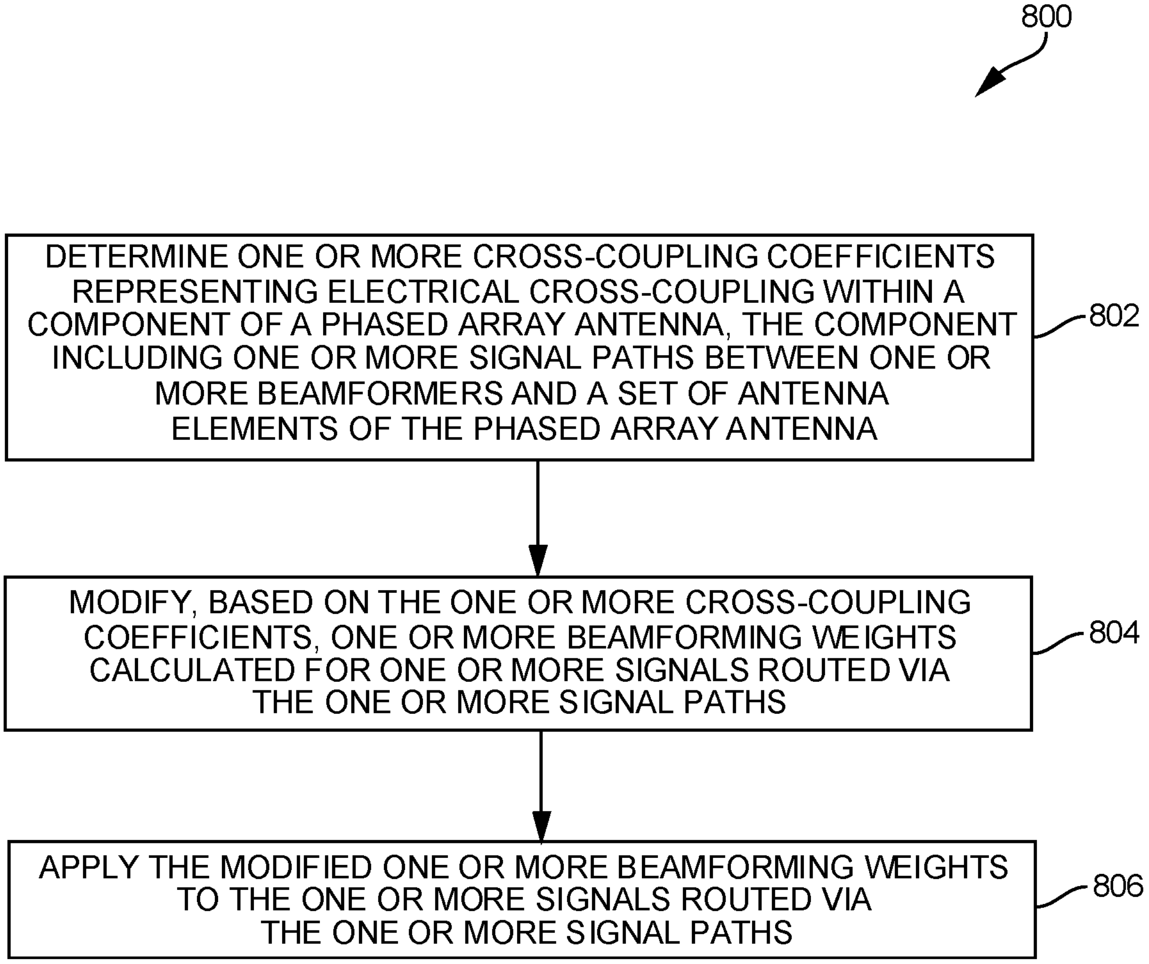
FIG. 8 is a flowchart illustrating an example method for cross-coupling modeling and compensation, in accordance with some examples of the present disclosure.
Figure 9:
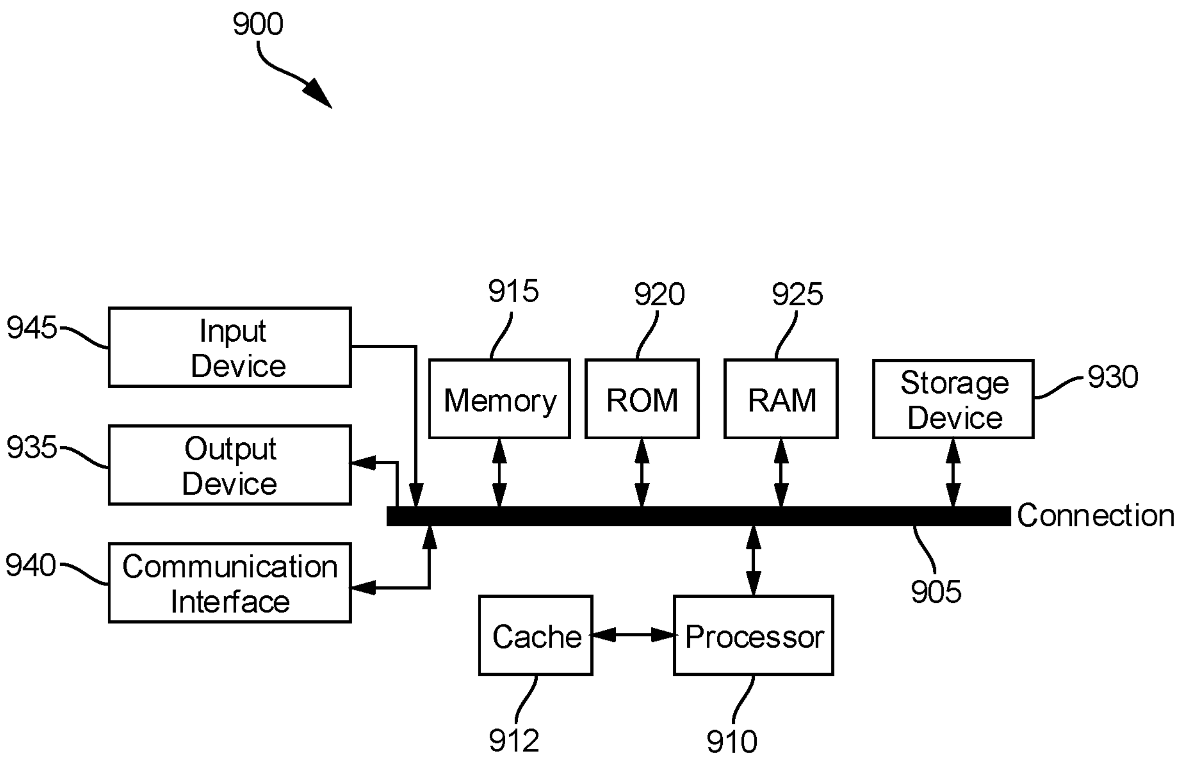
FIG. 9 illustrates an example computing device architecture, in accordance with some examples of the present disclosure.

The present technologies will be described in the following disclosure as follows. The discussion begins with a description of example systems and technologies for wireless communications and cross-coupling modeling and compensation for phased array antennas, as illustrated in FIGS. 1A through 7B. A description of an example method for cross-coupling modeling and compensation for phased array antennas, as illustrated in FIG. 8, will then follow. The discussion concludes with a description of an example computing device architecture including example hardware components suitable for cross-coupling modeling and compensation for phased array antennas, as illustrated in FIG. 9. The disclosure now turns to FIG. 1A.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively "102"), one or more satellite access gateways (SAGs) 104A-104N (collectively "104"), user terminals (UTs) 112A-112N (collectively "112"), user network devices 114A-114N (collectively "114"), and a ground network 120 in communication with a network 130, such as the Internet.

The SATs 102 can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. The SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, user equipment, antenna systems, communication nodes, base stations, access points, and/or any other suitable device or equipment. In some cases, the user terminals 112 and/or the SAGS 104 can perform phased-array beam-forming and digital-processing to support highly directive, steered antenna beams that track the SATs 102. Moreover, the user terminals 112 and/or the SAGs 104 can use one or more frequency bands to communicate with the SATs 102, such as the Ku and/or Ka frequency bands.

The user terminals 112 can be used to connect the user network devices 114 to the SATs 102 and ultimately the Internet 130. The SAGS 104 can be used to connect the ground network 120 and the Internet 130 to the SATs 102. For example, the SAGs 104 can relay communications from the ground network 120 and/or the Internet 130 to the SATs 102, and communications from the SATs 102 (e.g., communications originating from the user network devices 114, the user terminals 112, or the SATs 102) to the ground network 120 and/or the Internet 130.

The user network devices 114 can include any electronic devices with networking capabilities and/or any combination of electronic devices such as a computer network. For example, the user network devices 114 can include routers, network modems, switches, access points, smart phones, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles or devices, user networks, etc. The ground network 120 can include one or more networks and/or data centers. For example, the ground network 120 can include a public cloud, a private cloud, a hybrid cloud, an enterprise network, a service provider network, an on-premises network, and/or any other network.

In some cases, the SATs 102 can establish communication links between the SATs 102 and the user terminals 112. For example, SAT 102A can establish communication links 116 between the SAT 102A and the user terminals 112A-D and/or 112E-N. The communication links 116 can provide communication channels between the SAT 102A and the user terminals 112A-D and/or 112E-N. In some examples, the user terminals 112 can be interconnected (e.g., via wired and/or wireless connections) with the user network devices 114. Thus, the communication links between the SATs 102 and the user terminals 112 can enable communications between the user network devices 114 and the SATs 102. In some examples, each of the SATs 102A-N can serve user terminals 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the user terminals 112 and the communication links between the SATs 102 and the SAGs 104 can allow the SAGs 104 and the user terminals 112 to establish a communication channel between the user network devices 114, the ground network 120 and ultimately the Internet 130. For example, the user terminals 112A-D and/or 112E-N can connect the user network devices 114A-D and/or 114E-N to the SAT 102A through the communication links 116 between the SAT 102A and the user terminals 112A-D and/or 112E-N. The SAG 104A can connect the SAT 102A to the ground network 120, which can connect the SAGS 104A-N to the Internet 130. Thus, the communication links 108 and 116, the SAT 102A, the SAG 104A, the user terminals 112A-D and/or 112E-N and the ground network 120 can allow the user network devices 114A-D and/or 114E-N to connect to the Internet 130.

In some examples, a user can initiate an Internet connection and/or communication through a user network device from the user network devices 114. The user network device can have a network connection to a user terminal from the user terminals 112, which it can use to establish an uplink (UL) pathway to the Internet 130. The user terminal can wirelessly communicate with a particular SAT from the SATs 102, and the particular SAT can wirelessly communicate with a particular SAG from the SAGs 104. The particular SAG can be in communication (e.g., wired and/or wireless) with the ground network 120 and, by extension, the Internet 130. Thus, the particular SAG can enable the Internet connection and/or communication from the user network device to the ground network 120 and, by extension, the Internet 130.

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the Internet 130 is obtained for the user network device, the communication pathway can be reversed using the same or different SAT and/or SAG as used in the UL pathway.

In some examples, the communication links (e.g., 106, 108, and 116) in the wireless communication system 100 can operate using orthogonal frequency division multiple access (OFDMA) via time domain and frequency domain multiplexing. OFDMA, also known as multicarrier modulation, transmits data over a bank of orthogonal subcarriers harmonically related by the fundamental carrier frequency. Moreover, in some cases, for computational efficiency, fast Fourier transforms (FFT) and inverse FFT can be used for modulation and demodulation.

While the wireless communication system 100 is shown to include certain elements and components, one of ordinary skill will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
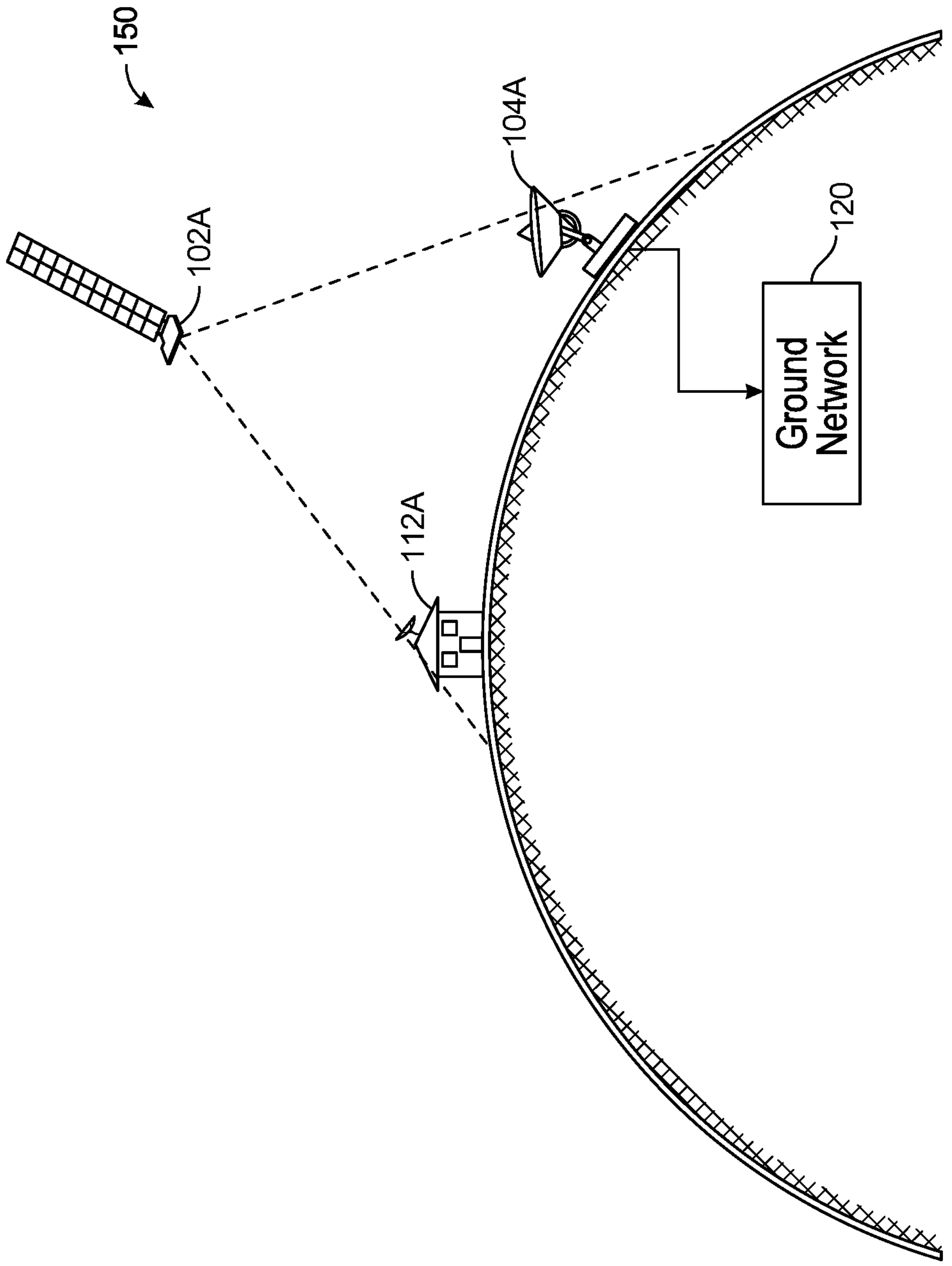
FIG. 1B is a simplified diagram illustrating an example of communication in a satellite communication system, in accordance with some examples of the present disclosure.

FIG. 1B is a diagram illustrating an example of an antenna and satellite communication system 100 in accordance with some examples of the present disclosure. As shown in FIG. 1B, an Earth-based UT 112A is installed at a location directly or indirectly on the Earth's surface such as a house, building, tower, vehicle, or another location where it is desired to obtain communication access via a network of satellites.

A communication path may be established between the UT 112A and SAT 102A. In the illustrated example, the SAT 102A, in turn, establishes a communication path with a SAG 104A. In another example, the SAT 102A may establish a communication path with another satellite prior to communication with SAG 104A. The SAG 104A may be physically connected via fiber optic, Ethernet, or another physical connection to a ground network 120. The ground network 120 may be any type of network, including the Internet. While one satellite is illustrated, communication may be with and between a constellation of satellites.

Figure 2A:
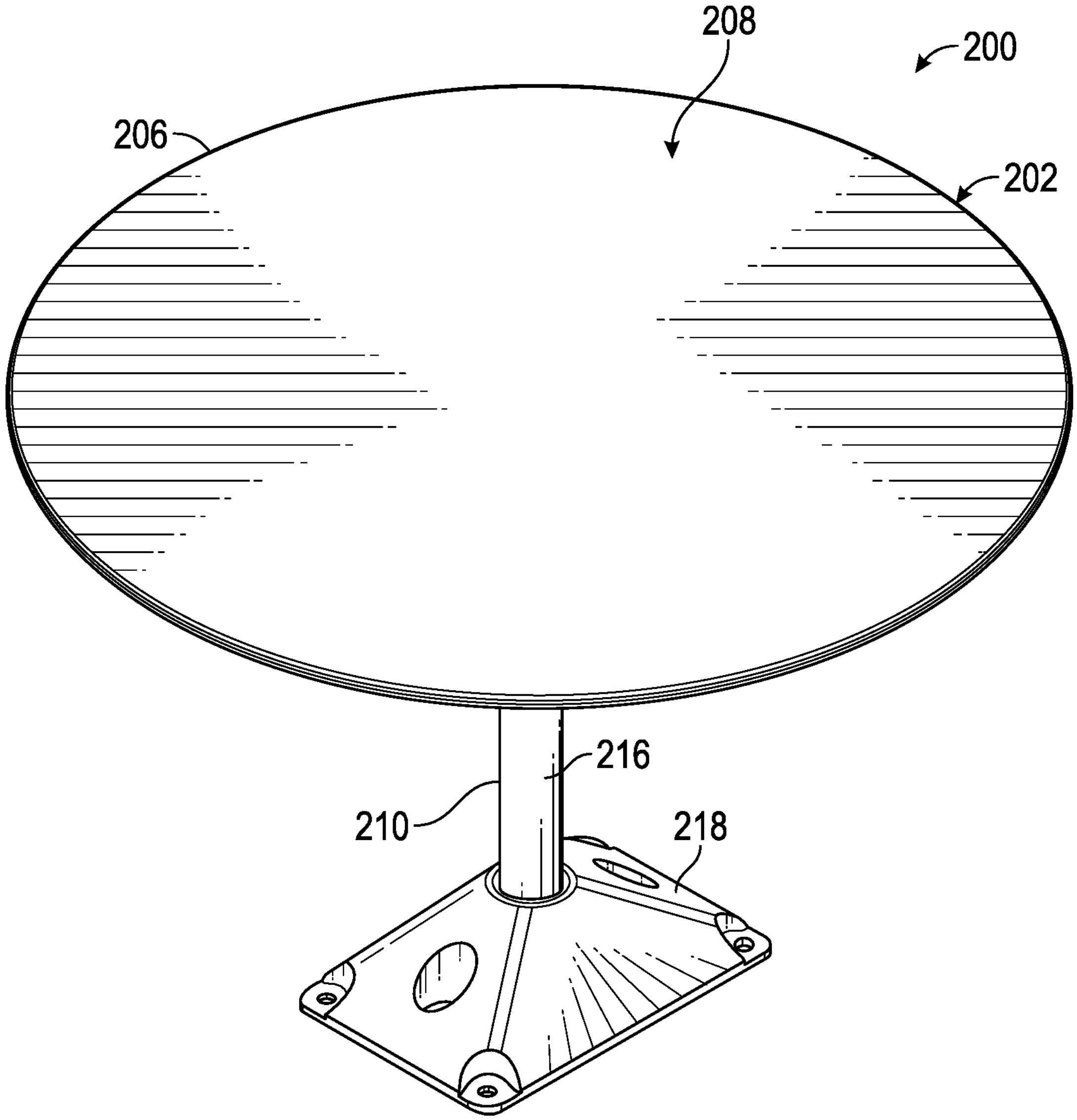
FIGS. 2A and 2B are isometric top and bottom views depicting an exemplary antenna apparatus, in accordance with some examples of the present disclosure.
Figure 2B:
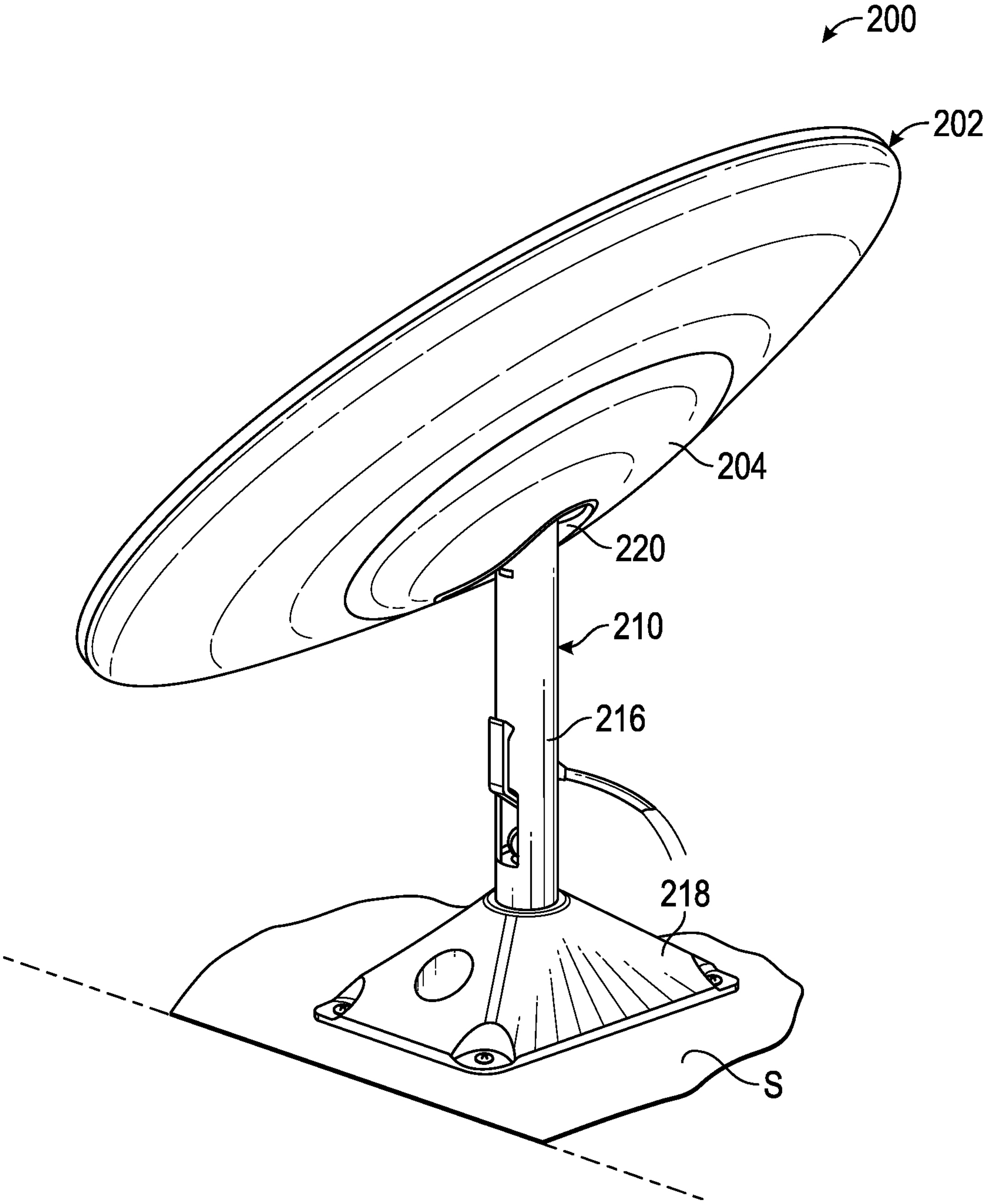

In some examples, the UT 112A may include an antenna system disposed in an antenna apparatus 200, for example, as illustrated in FIGS. 2A and 2B, designed for sending and/or receiving radio frequency signals to and/or from a satellite or a constellation of satellites. FIG. 2A illustrates an example top view of the antenna apparatus 200. The antenna apparatus 200 may include an antenna aperture 208 defining an area for transmitting and receiving signals, such as a phased array antenna system or another antenna system. The antenna apparatus 200 may include a top enclosure 208 that couples to a radome portion 206 to define a housing 202. The antenna apparatus 200 can also include a mounting system 210 having a leg 216 and a base 218.

FIG. 2B illustrates a perspective view of an underside of the antenna apparatus 200. As shown, the antenna apparatus 200 may include a lower enclosure 204 that couples to the radome portion 206 to define the housing 202. In the illustrated example, the mounting system 210 includes a leg 216 and a base 218. The base 218 may be securable to a surface S and configured to receive a bottom portion of the leg 216. A tilting mechanism 220 (details not shown) disposed within the lower enclosure 204 permits a degree of tilting to point the face of the radome portion 206 at a variety of angles for optimized communication and for rain and snow run-off.

Figure 3A:
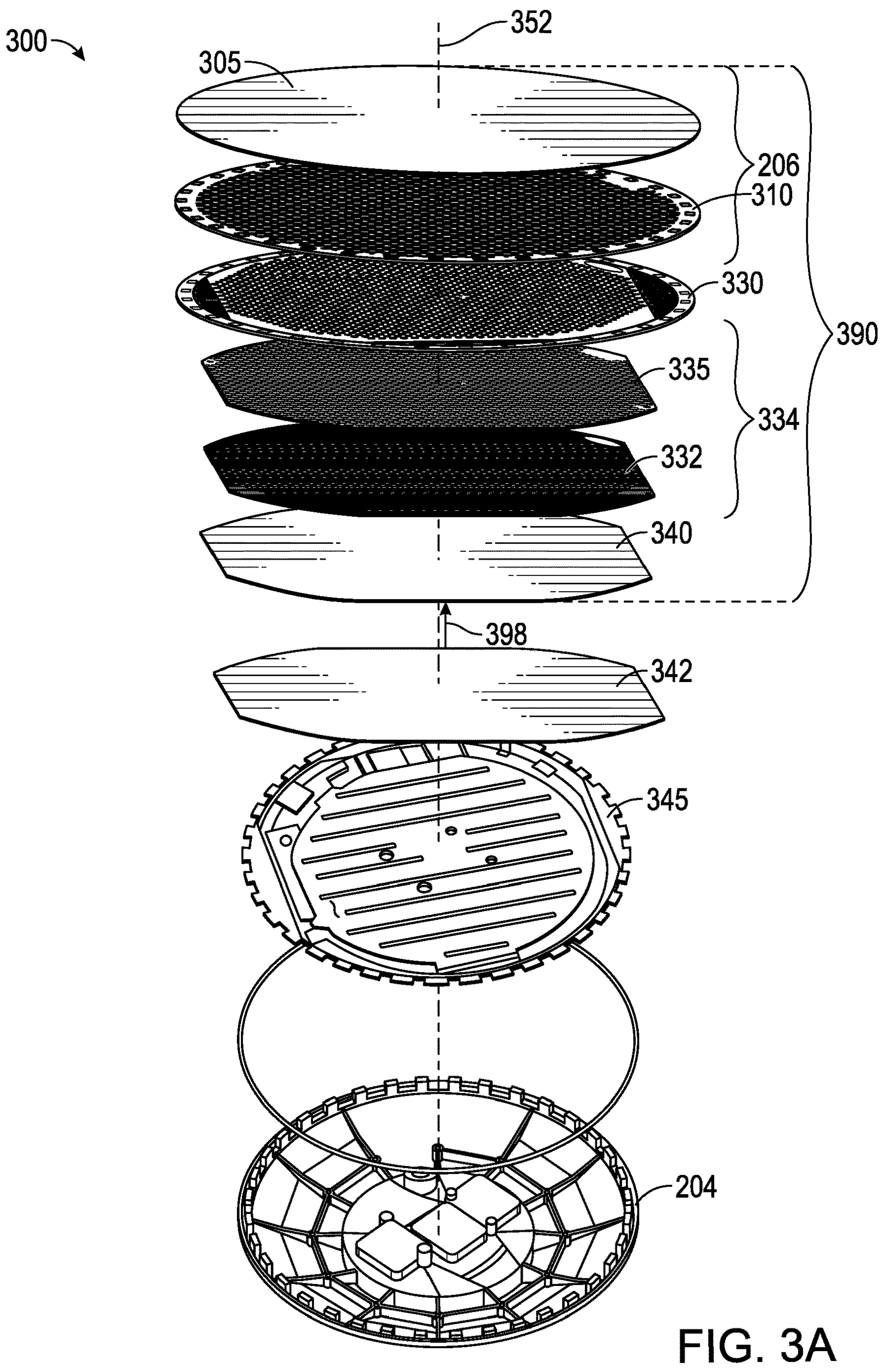
FIG. 3A is an isometric exploded view depicting an exemplary antenna apparatus including the housing and the antenna stack assembly, in accordance with some examples of the present disclosure.

Referring to FIG. 3A, an antenna stack assembly 300 can include a plurality of antenna components, which can include a printed circuit board (PCB) assembly 342 configured to couple to other electrical components disposed within the housing assembly 202 (including lower enclosure 204 and radome assembly 206). In the illustrated example, the antenna stack assembly 300 includes a phased array antenna assembly including a plurality of individual antenna elements configured in an array. The components of the phased array antenna assembly 334 may be mechanically and electrically supported by the PCB assembly 342.

Figure 3B:
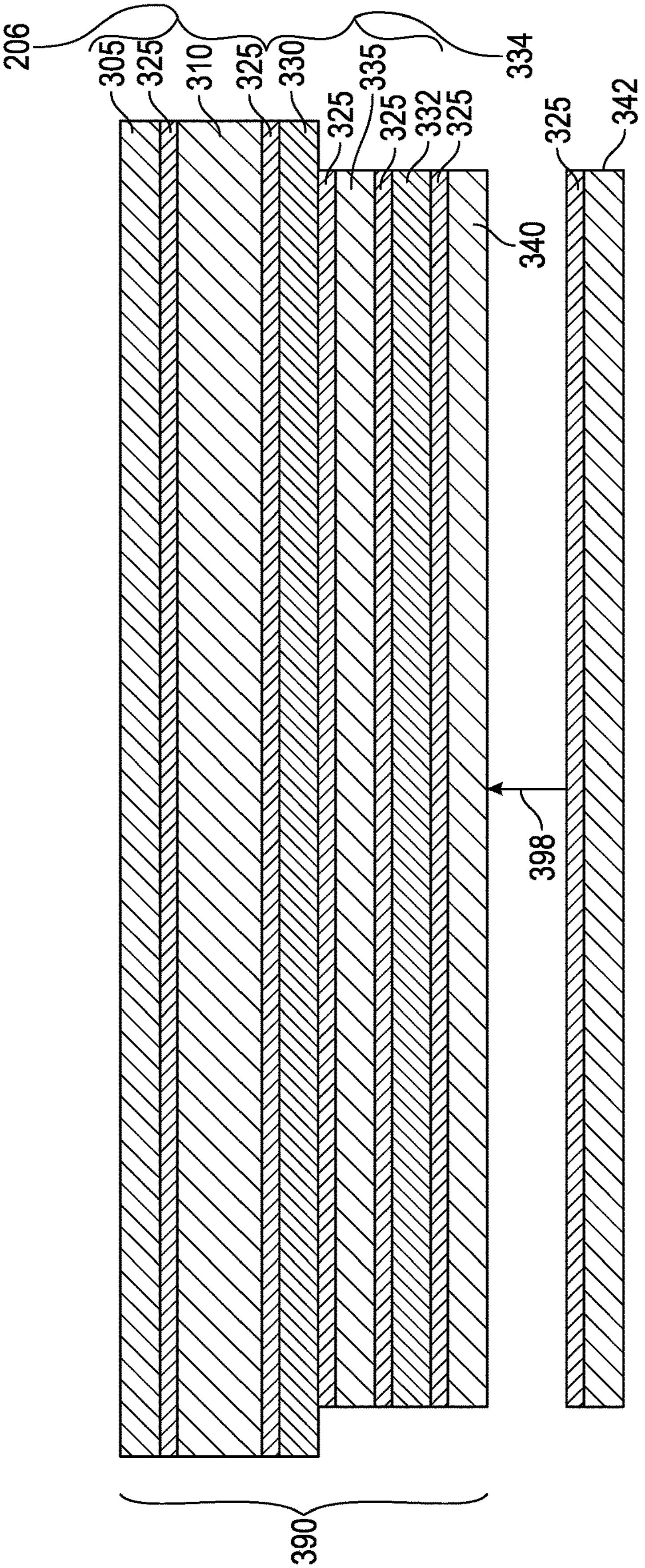
FIG. 3B is a cross-sectional view of an antenna stack assembly of an antenna apparatus, in accordance with some examples of the present disclosure.

In the illustrated example of FIGS. 3A and 3B, the layers in the antenna stack assembly 300 layup include a radome assembly 206 (including radome 305 and radome spacer 310), a phased array patch antenna assembly 334 (including upper patch layer 330, lower patch layer 332, and antenna spacer 335 in between), a dielectric layer 340, and PCB assembly 342, as will be described in greater detail below. As seen in FIG. 3B, the layers may include adhesive coupling 325 between adjacent layers.

Figure 4A:
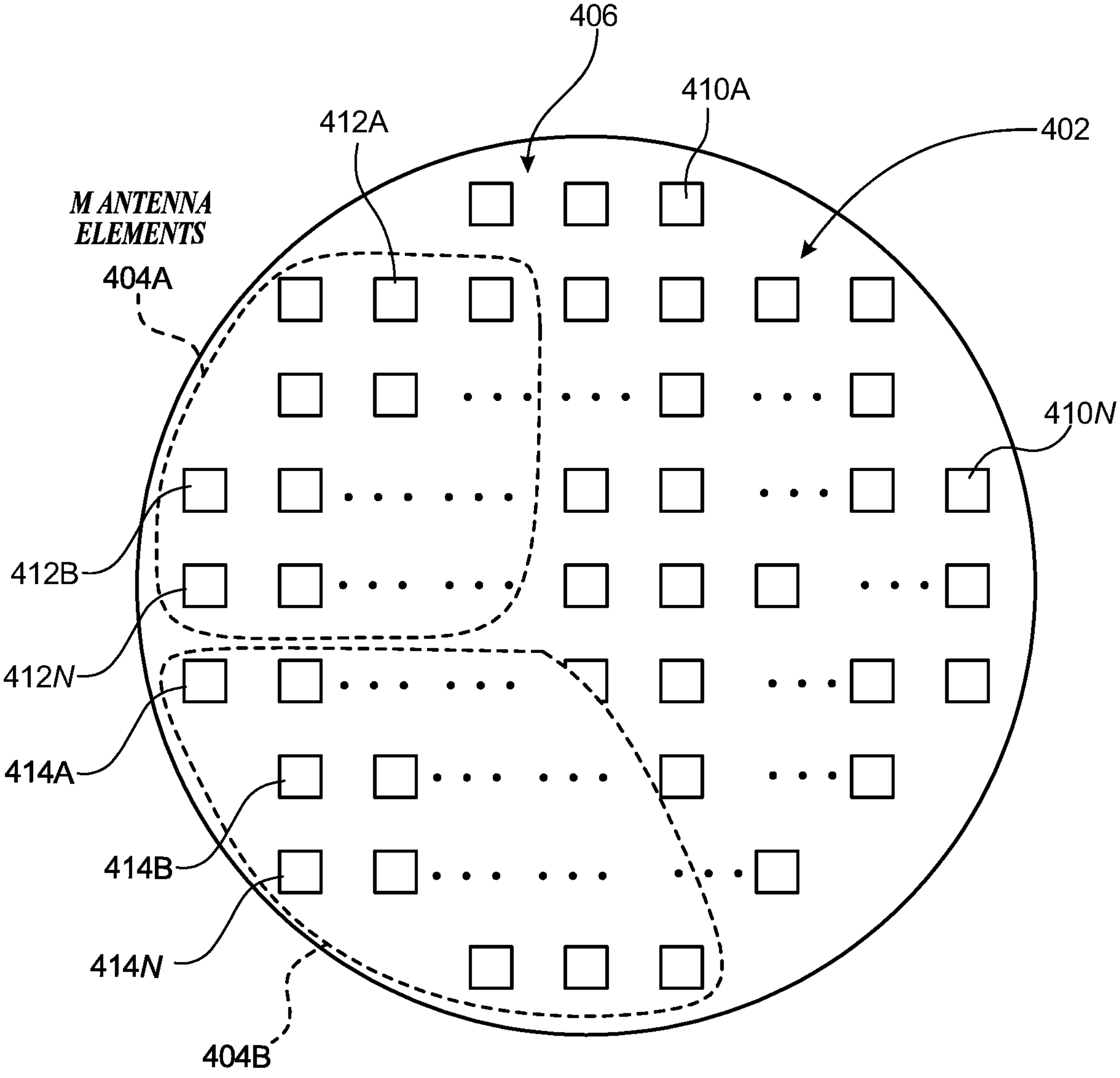
FIG. 4A is a diagram illustrating an example illustration of a top view of an antenna lattice, in accordance with some examples of the present disclosure.

FIG. 4A is a diagram illustrating an example top view of an antenna lattice 406, in accordance with some examples of the present disclosure. The antenna lattice 406 can be part of a phased array antenna system, as further described below with respect to FIGS. 4B and 4C. The antenna lattice 406 can include antenna elements 410A-N (collectively "410"), 412 A-N (collectively "412"), 414A-N (collectively "414") configured to transmit and/or send radio frequency signals. In some examples, the antenna elements 410, 412, 414 can be coupled to (directly or indirectly) corresponding amplifiers, as further described below with respect to FIGS. 4B and 4C. The amplifiers can include, for example, low noise amplifiers (LNAs) in the receiving (Rx) direction or power amplifiers (PAs) in the transmitting (Tx) direction.

An antenna aperture 402 of the antenna lattice 406 can be an area through which power is radiated or received. A phased array antenna can synthesize a specified electric field (phase and amplitude) across the aperture 402. The antenna lattice 406 can define the antenna aperture 402 and can include the antenna elements 410, 412, 414 arranged in a particular configuration that is supported physically and/or electronically by a PCB.

Figure 4B:
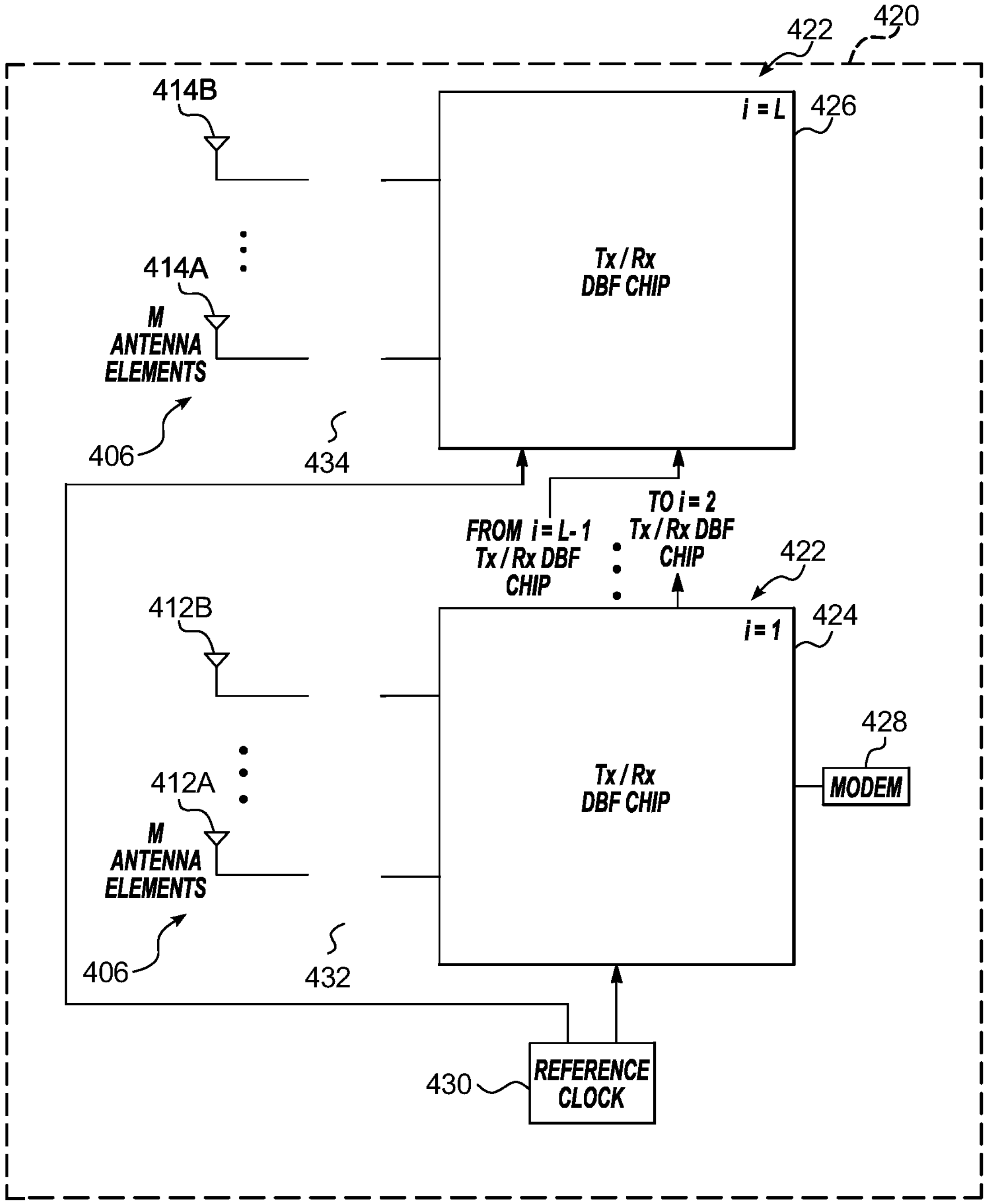
FIG. 4B is a diagram illustrating an example phased array antenna system, in accordance with some examples of the present disclosure.
Figure 4C:
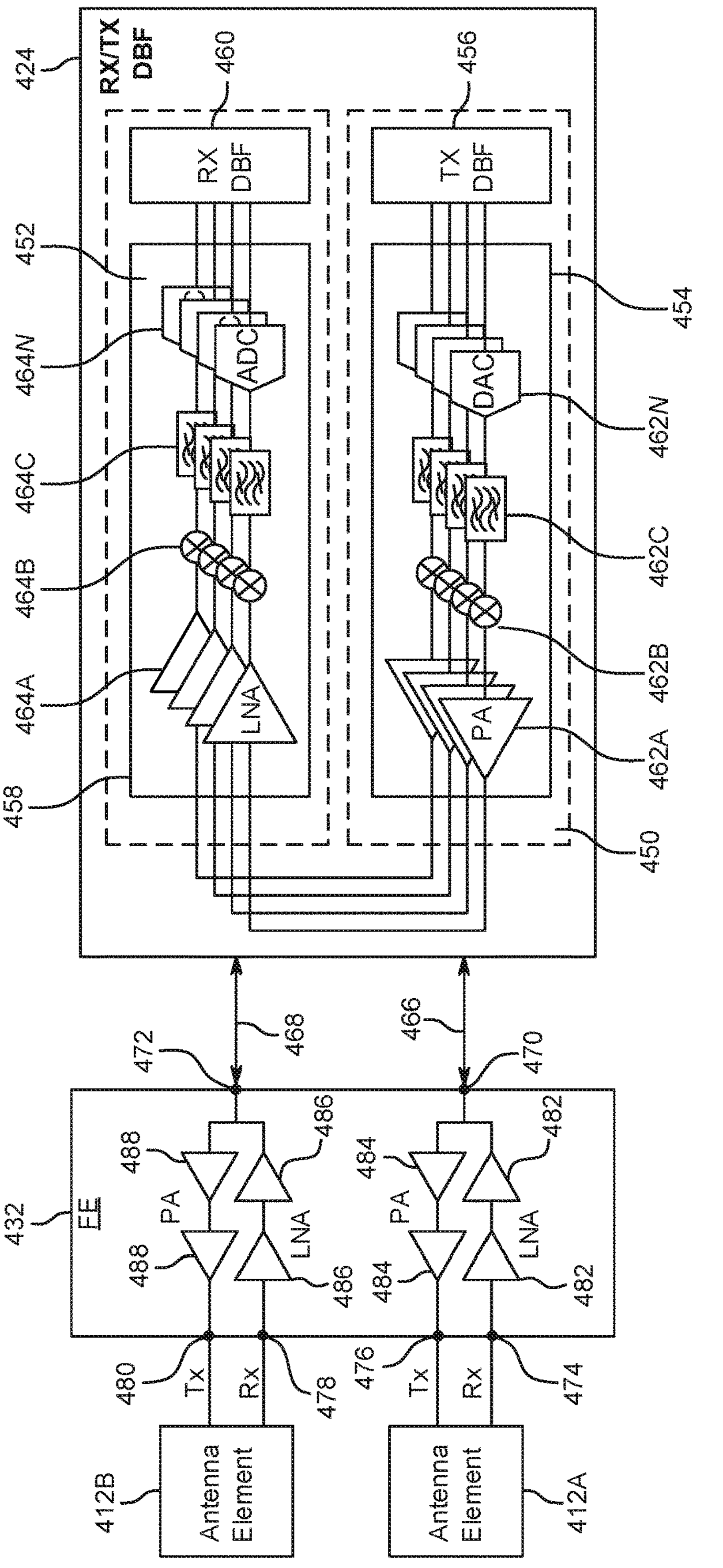
FIG. 4C is a diagram illustrating example components of a beamformer chip and a frontend that interfaces the beamformer chip with antenna elements, in accordance with some examples of the present disclosure.

In some cases, the antenna aperture 402 can be grouped into subsets of antenna elements 404A and 404B. Each subset 404A, 404B of antenna elements can include M number of antenna elements 412, 414, which can be associated with specific beamformer (BF) chips as shown in FIGS. 4B and 4C. The remaining antenna elements 410 in the antenna aperture 402 can be similarly associated with other beamformer chips (not shown).

FIG. 4B is a diagram illustrating an example phased array antenna system 420, in accordance with some examples. The phased array antenna system 420 can include an antenna lattice 406 including antenna elements 412, 414, and a beamformer lattice 422, which in this example includes digital beamformer (DBF) chips 424, 426, for receiving signals from a modem 428 in the transmit (Tx) direction and sending signals to the modem 428 in the receive (Rx) direction. The antenna lattice 406 can be configured to transmit or receive a beam of radio frequency signals having a radiation pattern from or to the antenna aperture 402.

The DBF chips 424, 426 in the beamformer lattice 422 can include an L number of DBF chips. For example, DBF chip 424 can include a DBF chip i (i=1, where i=1 to L), and so forth, and DBF chip 426 can include the Lth DBF chip (i=L) of the BF chips in the beamformer lattice 422. Each DBF chip of the beamformer lattice 422 electrically couples with a group of respective M number of antenna elements. In the illustrated example, DBF chip 424 electrically couples with M antenna elements 412 and DBF chip 426 electrically couples with M antenna elements 414. In the illustrated example, the DBF chips in the beamformer lattice 422 are electrically coupled to each other in a daisy chain arrangement. However, other types of beamformers (e.g., analog, hybrid, etc.), beamforming techniques, configurations, coupling arrangements, etc., are within the scope of the present disclosure. For example, in other implementations, aspects of the disclosure can be implemented using analog beamforming or hybrid beamforming (e.g., implementing combined aspects of analog and digital beamforming). As another example, in other implementations, aspects of the disclosure can be implemented using beamformers having a different arrangement(s) and/or electrical coupling structure (s) such as, for example and without limitation, a multiplex feed network or a hierarchical network or H-network.

Each DBF chip of the beamformer lattice 422 can include an integrated circuit (IC) chip or an IC chip package including a plurality of pins. In some cases, a first subset of the plurality of pins can be configured to communicate signals with a respective, electrically coupled DBF chip(s) (if in a daisy chain configuration), and/or modem 428 in the case of DBF chip 424. Moreover, a second subset of the plurality of pins can be configured to transmit/receive signals with M antenna elements, and a third subset of the plurality of pins can be configured to receive a signal from a reference clock 430. The DBF chips in the beamformer lattice 422 may also be referred to as transmit/receive (Tx/Rx) DBF chips, Tx/Rx chips, transceivers, DBF transceivers, and/or the like. As described above, the DBF chips may be configured for Rx communication, Tx communication, or both.

In some cases, the DBF chips 424, 426 in the beamformer lattice 422 can include amplifiers, phase shifters, mixers, filters, up samplers, down samplers, and/or other electrical components. In the receiving direction (Rx), a beamformer function can include delaying signals arriving from each antenna element so the signals arrive to a combining network at the same time. In the transmitting direction (Tx), the beamformer function can include delaying the signal sent to each antenna element such that the signals arrive at the target location at the same time (or substantially the same time). This delay can be accomplished by using "true time delay" or a phase shift at a specific frequency. In some examples, each of the DBF chips 424, 426 can be configured to operate in half duplex mode, where the DBF chips 424, 426 switch between receive and transmit modes as opposed to full duplex mode where RF signals/waveforms can be received and transmitted simultaneously.

The phased array antenna system 420 can also include frontend (FE) components 432, 434 that interface with the beamformer chips 424, 426 and the antenna elements 412, 414. For example, the FE 432 can communicatively couple the DBF chip 424 with M antenna elements 412, and the FE 434 can communicatively couple the DBF chip 426 with M antenna elements 414. The FEs 432, 434 can include RF or millimeter wave (mmWave) frontend integrated circuits, modules, devices, and/or any other type of frontend package and/or component(s). In some cases, the FEs 432, 434 can include multiple-input, multiple-output FEs interfacing with multiple antenna elements and one or more DBF chips.

Moreover, the FEs 432, 434 can include various components, such as RF ports, DBF ports, amplifiers (e.g., PAs, LNAs, etc.), and the like. In some examples, in Rx mode, the FEs 432, 434 can provide a gain to RF contents of each Rx input, and low noise power to suppress the signal-to-noise ratio impacts of noise contributors downstream in the Rx chain/path. Moreover, in Tx mode, the FEs 432, 434 can provide gain to each Tx path and drive RF power into a corresponding antenna element.

FIG. 4C is a diagram illustrating example components of a DBF chip 424 and a FE 432 that interfaces the DBF chip 424 with antenna elements 412A, 412B. In this example, the DBF chip 424 can include a transmit section 450 and a receive section 452, and the FE 432 can include RF ports 470, 472 for RF inputs/outputs to and from the DBF chip 424, Rx and Tx ports 474, 476 for transmit and receive signals to and from antenna element 412A, and Rx and Tx ports 478, 480 for transmit and receive signals to and from antenna element 412B.

The transmit section 450 can include a transmit digital beamformer (Tx DBF) 456 and one or more RF sections 454. The Tx DBF 456 can include a number of components (e.g., digital and/or analog) such as, for example and without limitation, a time delay filter, a filter, a gain control, one or more phase shifters, one or more up samplers, one or more IQ gain and phase compensators, and the like. Each RF section 454 can also include a number of components (e.g., digital and/or analog). In this example, each RF section 454 includes a power amplifier (PA) 462A, a mixer 462B, a filter 462C such as a low pass filter, and a digital-to-analog converter (DAC) 462N. The one or more RF sections 454 can be configured to ready the time delay and phase encoded digital signals for transmission. In some examples, the one or more RF sections 454 can include an RF section 454 for each RF path 466, 468 to each antenna element 412A, 412B.

The receive section 452 can include a receive digital beamformer (Rx DBF) 460 and one or more RF sections 458. The Rx DBF 460 can include a number of components such as, for example and without limitation, a time delay filter, a filter, an adder, one or more phase shifters, one or more down samplers, one or more filters, one or more IQ compensators, one or more direct current offset compensators (DCOCs), and the like. Each RF section 458 can also include a number of components. In this example, each RF section 458 includes a low noise amplifier (LNA) 464A, a mixer 464B, a filter 464C such as a low pass filter, and an analog-to-digital converter (ADC) 464N. In some examples, the one or more RF sections 458 can include an RF section 458 for each RF path 466, 468 to each antenna element 412A, 412B.

The FE 432 can include one or more components 482 for processing Rx signals from the antenna element 412A and one or more components 484 for processing Tx signals to the antenna element 412A. The FE 432 can also include one or more components 486 for processing Rx signals from the antenna element 412B and one or more components 488 for processing Tx signals to the antenna element 412B. In FIG. 4C, the components 482 and 486 include LNAs to amplify respective signals from the antenna elements 412A, 412B without significantly degrading the signal-to-noise ratio of the signals, and the components 484 and 488 include PAs to amplify signals from the transmit section 456 to the antenna elements 412A, 412B. In some examples, the FE 432 can include other components such as, for example, phase shifters (e.g., for Rx and/or Tx).

In some cases, the FE 432 can be communicatively coupled to one or more 90-degree hybrid couplers (not shown), which can be communicatively coupled to the antenna elements 412A, 412B. In some examples, a 90-degree hybrid coupler can be used for power splitting in the Rx direction and power combining in the Tx direction and/or to interface the FE 432 with a circularly polarized antenna element. However, other directional coupler mechanisms are within the scope of the present disclosure.

The DBF chip 424 and FE 432 can process data signals, streams, or beams for transmission by the antenna elements 412A, 412B, and receive data signals, streams, or beams from antenna elements 412A, 412B. The DBF chip 424 can also recover/reconstitute the original data signal in a signal received from antenna elements 412A, 412B and FE 432. Moreover, the DBF chip 424 can strengthen signals in desired directions and suppress signals and noise in undesired directions.

For example, in transmit mode (e.g., the transmit direction), the one or more RF sections 454 of the transmit section 450 can process signals from the Tx DBF 456 and output corresponding signals amplified by the PA 462A. Signals to the antenna element 412A can be routed through signal path 466 to RF port 470 of the FE 432, and signals to the antenna element 412B can be routed through signal path 468 to RF port 472 of the FE 432. The FE 432 can process an RF signal received from signal path 466 and output an amplified RF signal through Tx port 476. Antenna element 412A can receive the amplified RF signal and radiate the amplified RF signal. Similarly, the FE 432 can process an RF signal received from signal path 468 and output an amplified RF signal through Tx port 480. Antenna element 412B can receive the amplified RF signal and radiate the amplified RF signal.

In receive mode (e.g., the receive direction), FE 432 can receive RF signals from antenna elements 412A, 412B and process the RF signals using components 482 and 486. The FE 432 can receive RF signals from antenna element 412A via RF port 474, and RF signals from antenna element 412B through RF port 478. The components 482 and 486 can amplify respective RF signals from the antenna elements 412A, 412B without significantly degrading the signal-to-noise ratio of the RF signals. The components 482 can output RF signals from the antenna element 412A, which can be routed from RF port 470 of the FE 432 through the signal path 466 to the receive section 452 of the DBF 424. Similarly, the components 486 can output RF signals from the antenna element 412B, which can be routed from RF port 472 of the FE 432 through the signal path 468 to the receive section 452 of the DBF 424.

The one or more RF sections 458 of the receive section 452 of the DBF 424 can process the received RF signals and output the processed signal to the Rx DBF 460. In some example, the processed signal can include a signal amplified by an LNA 464A of RF section 458. The Rx DBF 460 can receive the signal and output a beamformed signal to a modem (e.g., modem 428).

In some examples, the transmit section 450 and the receive section 452 can support a same number and/or set of antenna elements. In other examples, the transmit section 450 and the receive section 452 can support different numbers and/or sets of antenna elements. Moreover, while FIG. 4C illustrates a single FE interfacing with the DBF chip 424, it should be noted that a DBF chip can interface with multiple FEs. The configuration of a single FE interfacing with a DBF chip in FIG. 4C is merely an illustrative example provided for explanation purposes. Also, while the FE 432 is shown in FIG. 4C with 2 RF inputs (e.g., RF ports 474 and 478) and 2 RF outputs (e.g., RF ports 476 and 480) supporting 2 antenna elements (e.g., antenna elements 412A and 412B), it should be noted that, in other examples, the FE 432 can include more or less RF inputs/outputs and can support more or less antenna elements than shown in FIG. 4C. For example, in some cases, the FE 432 can include 4 RF inputs and 4 RF outputs and can support more than 2 antenna elements.

While the DBF chip 424 and the FE 432 are shown to include certain elements and components, one of ordinary skill will appreciate that the DBF chip 424 and the FE 432 can include more or fewer elements and components than those shown in FIG. 4C. For example, in some cases, the DBF chip 424 and/or the FE 432 can be coupled to, reside on, and/or implemented by, a printed circuit board (PCB) of the phased array antenna system and/or any number of discrete parts on a PCB. The elements and components of the DBF chip 424 and the FE 432 shown in FIG. 4C are merely illustrative examples provided for explanation purposes. Moreover, the example phased array antenna system 420 in FIG. 4B is merely an example implementation provided for explanation purposes. One of skill in the art will recognize that, in other implementations, the phased array antenna system 420 can include more or less of the same and/or different components than those shown in FIG. 4B. For example, in other implementations, the phased array antenna system 420 can implement analog beamformers, hybrid beamformers, a different number and/or arrangement of beamformers and/or FEs, and/or any other type and/or configuration of beamformers and/or FEs.

In some cases, a crowded electromagnetic environment in a MIMO system (and/or other components associated with the MIMO system such as a PCB, among others) can cause unwanted cross-coupling within the MIMO system (and/or other components associated with the MIMO). For example, a crowded electromagnetic environment in the FE 432 can cause unwanted cross-coupling between the signal paths to and from the antenna elements 412A, 412B. The cross-coupling can negatively impact the performance of the phased array antenna system, distort radiation patterns, change and/or distort the properties of the signals to and from the antenna elements in undesired ways, and/or produce other undesired effects. For example, the electromagnetic interactions from cross-coupling can cause signal interference, phase shifts, harmonic distortion, integrity losses, grating lobes that dominate the peak sidelobe profile, among others.

Figure 5A:
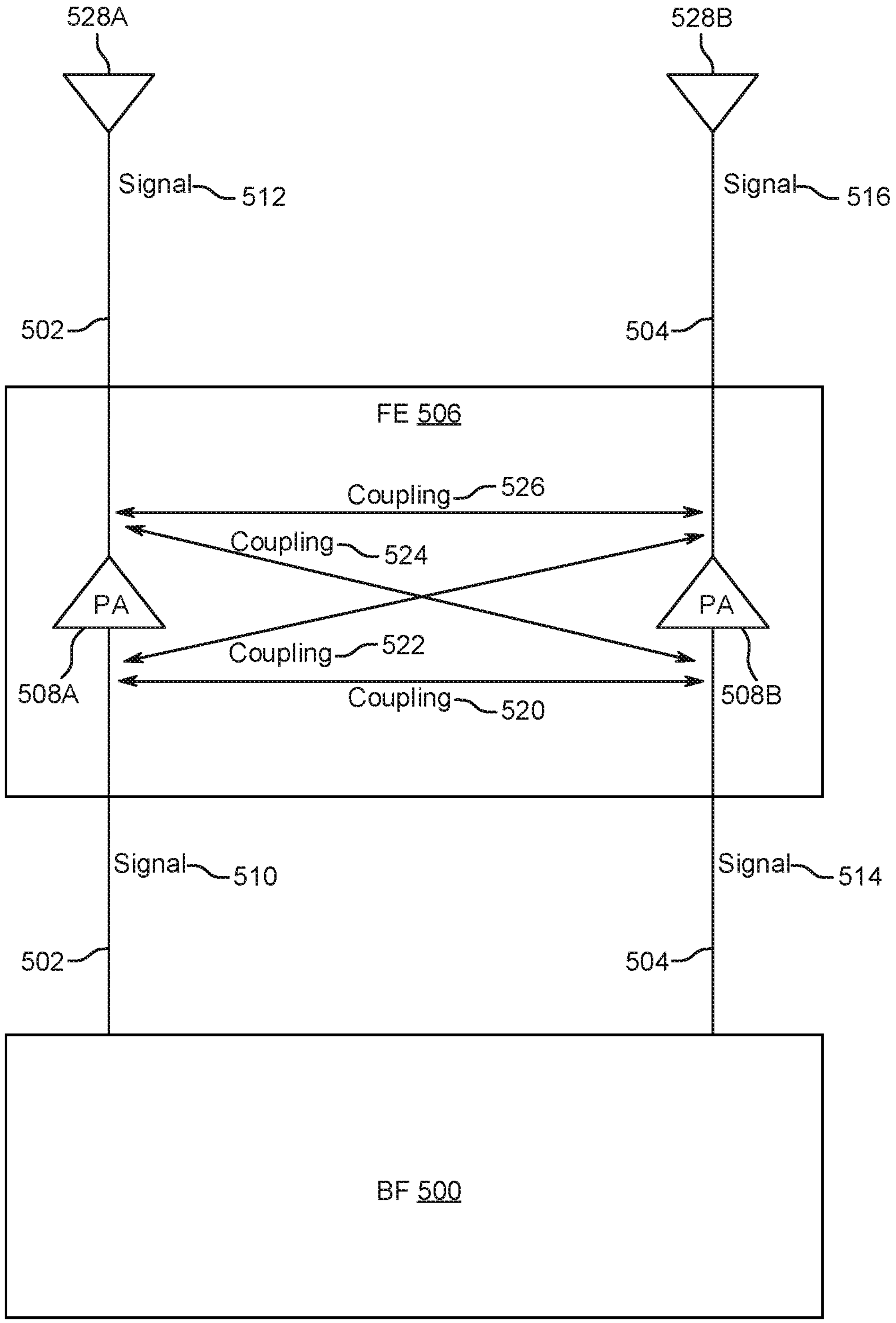
FIG. 5A is a diagram illustrating example cross-couplings between transmit paths at a frontend of a phased array antenna system, in accordance with some examples of the present disclosure.

FIG. 5A illustrates example cross-couplings between transmit paths at the FE 506. In this example, an input signal 510 from the BF 500 to the FE 506 can propagate through signal path 502 to antenna element 528A, and an input signal 514 from the BF 500 to the FE 506 can propagate through signal path 504 to antenna element 528B. At the FE 506, the input signal 510 can be amplified by PA 508A, which outputs amplified signal 512 to the antenna element 528A. Similarly, the input signal 514 can be amplified by PA 508B, which outputs amplified signal 516 to the antenna element 528B.

The signals 510, 512 at signal path 502 and the signals 514, 516 at signal path 504 can experience cross-coupling at the FE 506. FIG. 5A illustrates various example cross-coupling paths 520, 522, 524, 526 at the FE 506. The cross-coupling paths 520, 522, 524, 526 at the FE 506 can correspond to electromagnetic interactions between signal path 502 and signal path 504. The electromagnetic interactions can distort the amplified signals 512 and 516 to the antenna elements 528A and 528B. For example, cross-coupling at the coupling path 520 can distort the input signals 510 and/or 514 and subsequently signals 512 and/or 516 after PA amplification. Cross-coupling at the coupling path 522 can distort the input signal 510 and the subsequently amplified signal 512. Cross-coupling at the coupling path 524 can distort the input signal 514 and the subsequently amplified signal 516. Cross-coupling at the coupling path 526 can distort the amplified signals 512 and/or 516. The cross-coupling at the coupling paths 520, 522, 524, 526 can contribute to the signal distortion of the amplified signals 512, 516 and can cause phase errors at the antenna elements 528A, 528B. In some cases, grating lobes can appear in a resulting radiation pattern when a phased-array antenna is implemented with a repeated pattern of such FEs and antenna elements (e.g., with same or similar cross-couplings).

In some examples, the signals 510, 514 can include a weighted (e.g., beamformed) version of several and/or different RF signals. In other examples involving single-beam phased array antennas, the signals 510, 514 can include a weighted (e.g., beamformed) version of the same RF signal. A beamforming weight can include a gain, phase shift, and/or time delay applied to a signal to and/or from each antenna element to electronically steer a beam according to a desired direction and/or radiation pattern. For example, in some cases, a particular beamforming weight can be applied to signal 510 and a different beamforming weight can be applied to signal 514 to produce a desired radiation pattern. If the relative beamforming weights of the signals 512, 516 to antenna elements 528A, 528B are subsequently modified, the modified beamforming weights can impact the radiation pattern of the phased array antenna.

Moreover, cross-coupling within the FE 506, as described herein, can similarly impact the radiation pattern of the phased array antenna, often in undesired ways. For example, cross-coupling within the FE 506 can modify the signal 512 to antenna element 528A and the signal 516 to antenna element 528B. Thus, instead of signal 512 to antenna element 528A including the signal with the beamforming weight applied by the BF 500, the signal 512 can include the signal with the beamforming weight further modified by a cross-coupling coefficient associated with the cross-coupling within the FE 506. Similarly, instead of signal 516 to antenna element 528B including the signal with the beamforming weight applied by the BF 500, the signal 516 can include the signal with the beamforming weight further modified by a cross-coupling coefficient associated with the cross-coupling within the FE 506. Accordingly, in some examples, the techniques described herein calculate the cross-coupling coefficient(s) associated with electrical cross-coupling, and use the cross-coupling coefficient(s) to compensate a beamforming weight and/or a beamformed signal in order to mitigate and/or cancel the cross-coupling within the FE 506 (and/or within other components of the phased array antenna system), reduce or suppress undesired grating lobes caused and/or amplified by the cross-coupling at the FE 506, and/or reduce or mitigate other cross-coupling effects.

Figure 5B:
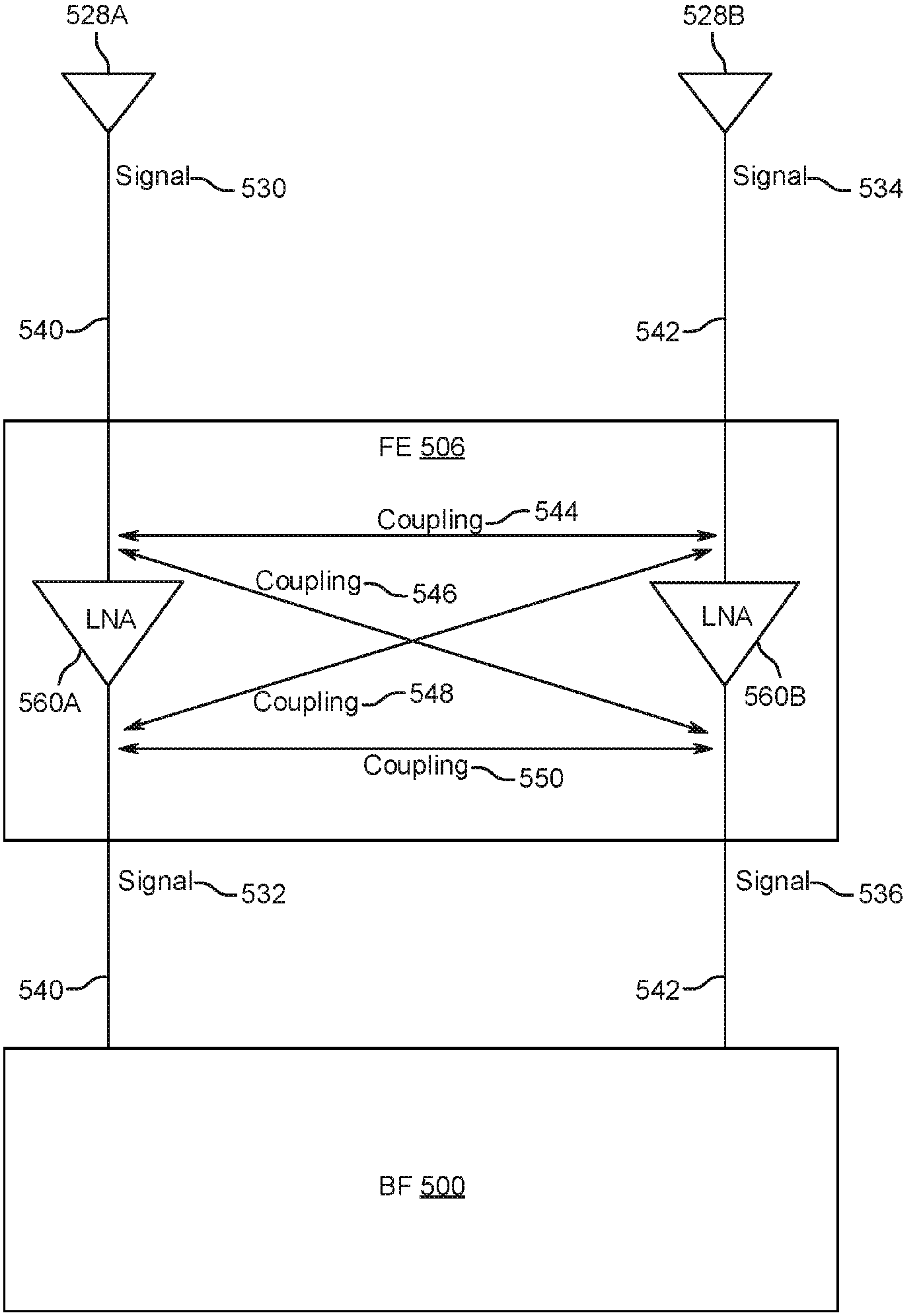
FIG. 5B is a diagram illustrating example cross-couplings between receive paths at a frontend of a phased array antenna system, in accordance with some examples of the present disclosure.

FIG. 5B illustrates example cross-couplings between receive paths at the FE 506. In this example, signal 530 from antenna element 528A to the FE 506 can propagate through signal path 540 to BF 500, and signal 534 from antenna element 528B to the FE 506 can propagate through signal path 542 to BF 500. At the FE 506, the signal 530 can be amplified by LNA 528A, which outputs amplified signal 532 to the BF 500. Similarly, the signal 534 can be amplified by LNA 528B, which outputs amplified signal 536 to the BF 500.

The signals 530, 532 at signal path 540 and the signals 534, 536 at signal path 542 can experience cross-coupling at the FE 506. FIG. 5B illustrates various example cross-coupling paths 544, 546, 548, 550 at the FE 506. The cross-coupling paths 544, 546, 548, 550 can correspond to electromagnetic interactions between signal path 540 and signal path 542. The electromagnetic interactions can distort the amplified signals 532 and 536 to the BF 500. For example, cross-coupling at the coupling path 544 can distort the signals 530 and/or 534 and the subsequently amplified signals 532, 536. Cross-coupling at the coupling path 546 can distort the signal 530 and the subsequently amplified signal 532. Cross-coupling at the coupling path 548 can distort the signal 534 and the subsequently amplified signal 536. Cross-coupling at the coupling path 550 can distort the amplified signal 532 and/or 536. The cross-coupling at the coupling paths 544, 546, 548, 550 can contribute to the signal distortion of the amplified signals 532, 536 and can cause phase errors at the BF 500.

In some examples, the signals 510, 514 can include a weighted (e.g., beamformed) version of several and/or different RF signals. In other examples involving single-beam phased array antennas, the signals 510, 514 can include a weighted (e.g., beamformed) version of the same RF signal. A beamforming weight can include a gain, phase shift, and/or time delay applied to a signal to and/or from each antenna element to electronically steer a beam according to a desired radiation pattern. For example, in some cases, a particular beamforming weight can be applied to signal 510 and a different beamforming weight can be applied to signal 514 to produce a desired radiation pattern. If the relative beamforming weights of the signals 512, 516 to antenna elements 528A, 528B are subsequently modified, the modified beamforming weights can impact the radiation pattern of the phased array antenna.

In some cases, cross-coupling within the FE 506, as described herein, can similarly impact the pattern and/or characteristics of the signals 532, 536 from antenna elements 528A, 528B in undesired ways. For example, cross-coupling within the FE 506 can modify the signal 532 from antenna element 528A and the signal 536 from antenna element 528B based on a respective cross-coupling coefficient. Thus, when BF 500 applies a beamforming weight to signal 532 from antenna element 528A, the signal with the beamforming weight applied (and/or the signal properties) can be distorted and/or impacted by a cross-coupling coefficient associated with the cross-coupling within the FE 506. Similarly, when BF 500 applies a beamforming weight to signal 536 from antenna element 528B, the signal with the beamforming weight applied can be distorted and/or impacted by a cross-coupling coefficient associated with the cross-coupling within the FE 506. Accordingly, as further described herein, in some examples, the techniques herein calculate the cross-coupling coefficient(s) and use the cross-coupling coefficient(s) to compensate a beamforming weight and/or a beamformed signal in order to mitigate and/or cancel the cross-coupling within the FE 506 (and/or within other components of the phased array antenna system), and/or reduce or suppress undesired grating lobes caused and/or amplified by the cross-coupling at the FE 506.

Figure 6A:
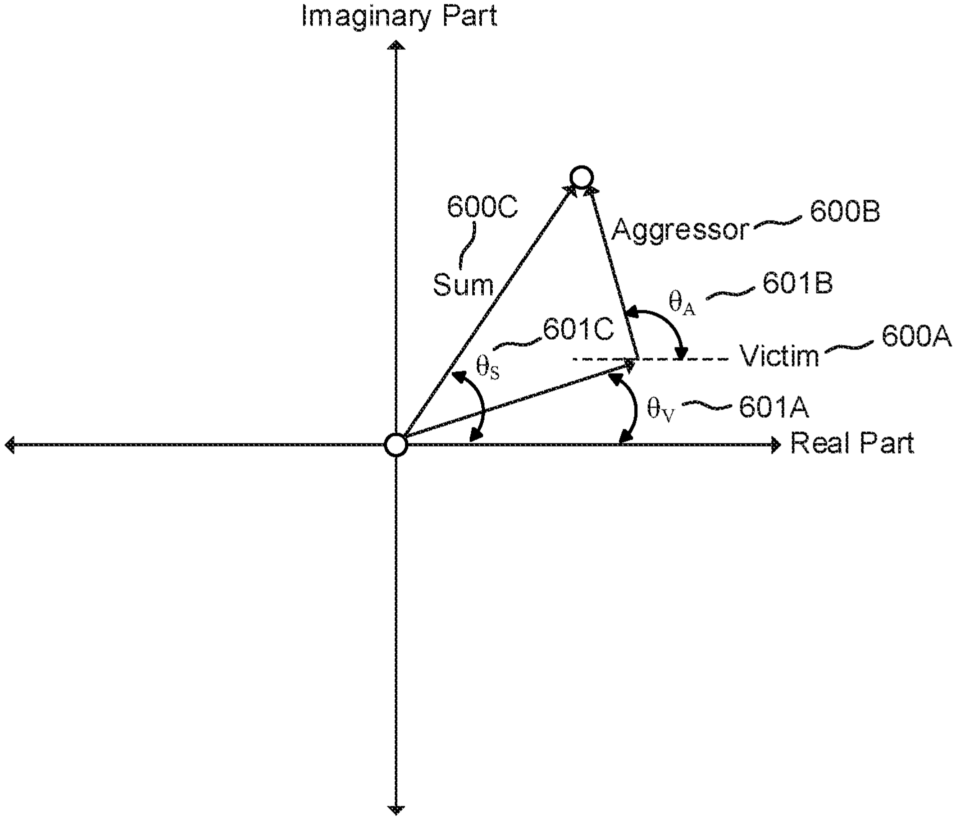
FIG. 6A is a diagram illustrating an example vector summation model defining a voltage magnitude and phase of a coupling product associated with a coupling victim and a coupling aggressor, in accordance with some examples of the present disclosure.

FIG. 6A is a diagram illustrating an example vector summation model defining a voltage magnitude and phase of a coupling product for a coupling victim and aggressor. In this example, a coupling victim 600A and a coupling aggressor 600B are modeled as vectors with linear voltage magnitudes and phases. Victim phase 601A represents the phase calculated for the vector of the coupling victim 600A, and aggressor phase 601B represents the phase calculated for the vector of the coupling aggressor 600B.

The vector sum 600C can be calculated based on a vector summation using the vector of the coupling victim 600A and the coupling aggressor 600B. The magnitude and phase 601C of the vector sum 600C represent the voltage magnitude and phase of the coupling product defined by the vector sum 600C. The vector summation model can be used to calculate cross-coupling phases and effects, as further illustrated in FIGS. 6B and 6C.

Figure 6B:
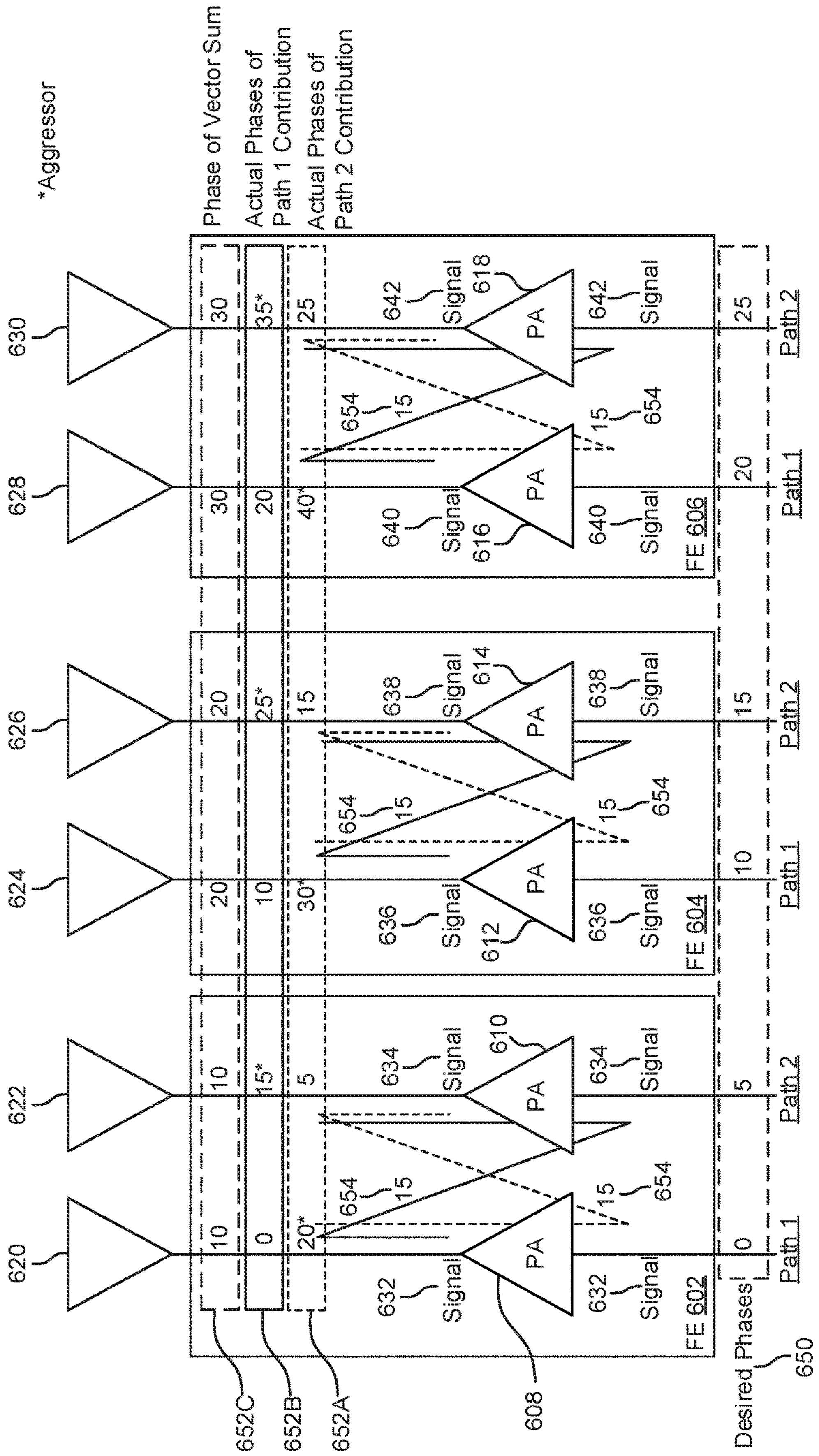
FIG. 6B is a diagram illustrating example signal phase shifts caused by cross-coupling at frontends interfacing with antenna elements of a phased array system, in accordance with some examples of the present disclosure.

FIG. 6B is a diagram illustrating example signal phase shifts caused by cross-coupling at frontends (FEs) 602, 604, 606 respectively interfacing with antenna elements 620 through 630. The FEs 602, 604, 606 can also interface with one or more BFs (not shown), from which the FEs 602, 604, 606 can receive input signals (e.g., in the Tx direction) or to which the FEs 602, 604, 606 can send output signals (e.g., in the Rx direction).

The input signals 632 through 642 can be configured to have desired phases 650. The input signals 632 through 642 can be complex-weighted copies (e.g., phase-shifted copies) of the same signal. In this example, the desired phases 650 configured for the signals 632 through 642 are 0, 5, 10, 15, 20, and 25, respectively. The actual phases 652A illustrate the respective phases of the cross-coupling contribution of path 2 (e.g., signals 634, 638, 642) at FEs 602, 604, 606 given the coupling phases 654 at the FEs 602, 604, 606. The actual phases 652B illustrate the respective phases of the cross-coupling contribution of path 1 (e.g., signals 632, 636, 640) at FEs 602, 604, 606 given the coupling phases 654 at the FEs 602, 604, 606. Phases 652C illustrate the respective phases of the vector sum of the actual phases 652A and 652B (assuming the coupling victim is equal in magnitude to the coupling aggressor) given the coupling phases 654 at the FEs 602, 604, 606.

At FE 602, the desired phase of the signal 632 at path 1 is 0 degrees, and the desired phase of the signal 634 at path 2 is 5 degrees. The actual phases of the path 1 contributions are 0 degrees (as shown in path 1) and 15 degrees (as shown in path 2), and the actual phases of the path 2 contributions are 20 degrees (as shown in path 1) and 5 degrees (as shown in path 2). The phase of the vector sum of the path 1 contribution and the path 2 contribution at FE 602 is 10 degrees (assuming the coupling victim is equal in magnitude to the coupling aggressor). As shown here, the signal 632 is amplified by PA 608 and the signal 634 is amplified by PA 610, and the signals 632 and 634 are phase shifted according to the phase of the vector sum of the phases of the path 1 and path 2 contributions as a result of the cross-coupling at FE 602.

At FE 604, the desired phase of the signal 636 at path 1 is 10 degrees, and the desired phase of the signal 638 at path 2 is 15 degrees. The actual phases of the path 1 contributions are 10 degrees (as shown in path 1) and 25 degrees (as shown in path 2), and the actual phases of the path 2 contributions are 30 degrees (as shown in path 1) and 15 degrees (as shown in path 2). The phase of the vector sum of the path 1 contribution and the path 2 contribution at FE 604 is 20 degrees (assuming the coupling victim is equal in magnitude to the coupling aggressor). As shown here, the signal 636 is amplified by PA 612 and the signal 638 is amplified by PA 614, and the signals 636 and 638 are phase shifted according to the phase of the vector sum of the phases of the path 1 and path 2 contributions as a result of the cross-coupling at FE 604.

At FE 606, the desired phase of the signal 640 at path 1 is 20 degrees, and the desired phase of the signal 642 at path 2 is 25 degrees. The actual phases of the path 1 contributions are 20 degrees (as shown in path 1) and 35 degrees (as shown in path 2), and the actual phases of the path 2 contributions are 40 degrees (as shown in path 1) and 25 degrees (as shown in path 2). The phase of the vector sum of the path 1 contribution and the path 2 contribution at FE 606 is 30 degrees (assuming the coupling victim is equal in magnitude to the coupling aggressor). As shown here, the signal 640 is amplified by PA 616 and the signal 642 is amplified by PA 618, and the signals 640 and 642 are phase shifted according to the phase of the vector sum of the phases of the path 1 and path 2 contributions as a result of the cross-coupling at FE 606.

Figure 6C:
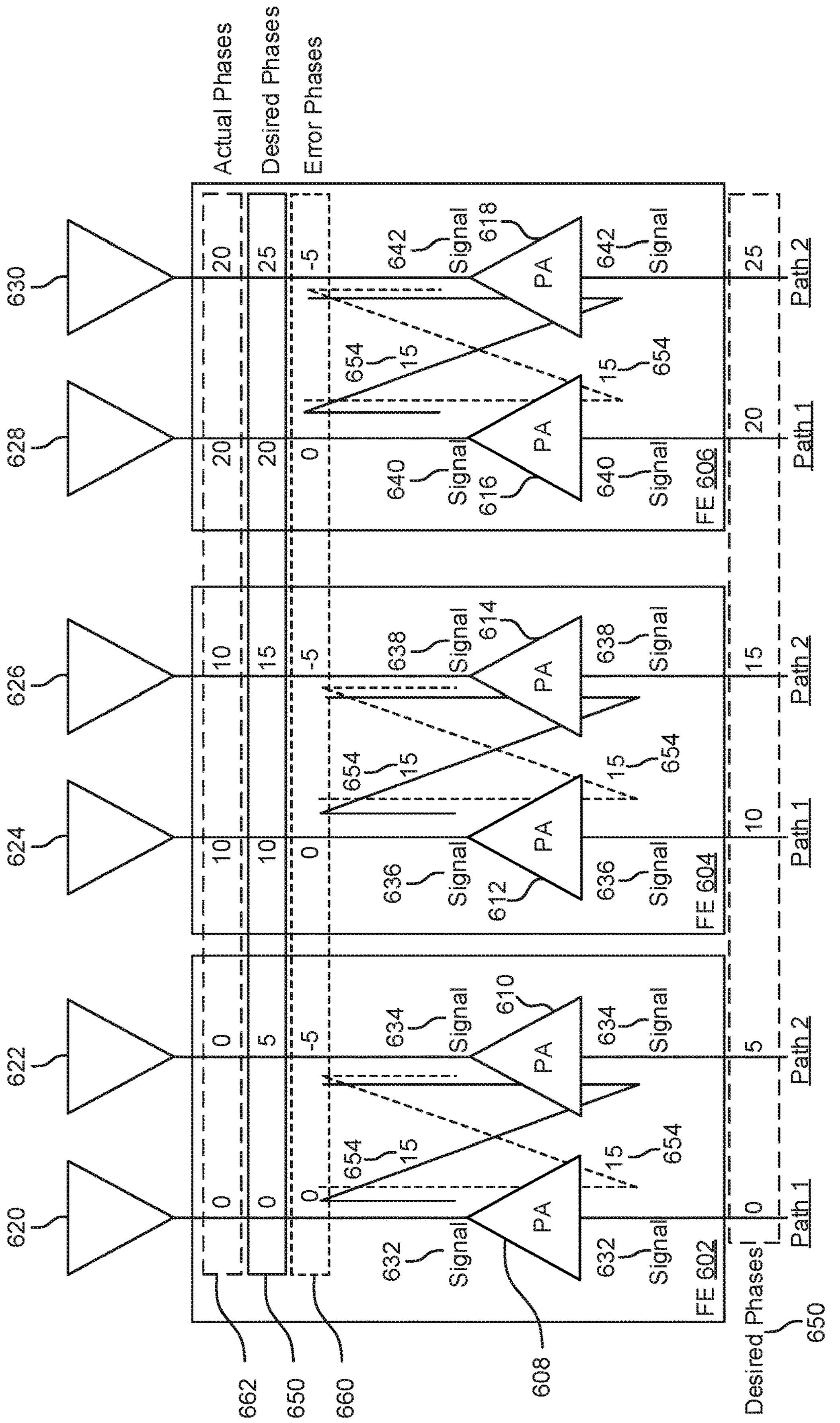
FIG. 6C is a diagram illustrating error phases of signals caused by cross-coupling and shown relative to desired phases of the signals, in accordance with some examples of the present disclosure.

FIG. 6C illustrates the error phases 660, desired phases 650 (relative to path 1 at FE 602), and the actual phases 662 (relative to path 1 at FE 602) of the signals 632 through 642 shown in FIG. 6A. In this illustrative example, because path 1 of FE 602 was chosen in this example as the phase reference, the error phase of signal 632 at path 1 of FE 602 is 0 degrees, which corresponds to the actual phase of the signal 632 as shown in FIG. 6C. The error phase of signal 634 at path 2 of FE 602 is −5 degrees. The desired phase (relative to path 1 at FE 602) of signal 632 at path 1 of FE 602 is 0 degrees, and the desired phase of signal 634 at path 2 of FE 602 is 5 degrees. Finally, the actual phase of signal 632 at path 1 and signal 634 at path 2 of FE 602 is 0 degrees.

The error phase of signal 636 at path 1 of FE 604 is 0 degrees, and the error phase of signal 638 at path 2 of FE 604 is −5 degrees. The desired phase (relative to path 1 at FE 602) of signal 636 at path 1 of FE 604 is 10 degrees, and the desired phase (relative to path 1 at FE 602) of signal 638 at path 2 of FE 604 is 15 degrees. The actual phase (relative to path 1 at FE 602) of signal 636 at path 1 and signal 638 at path 2 is 10 degrees.

The error phase of signal 640 at path 1 of FE 606 is 0 degrees, and the error phase of signal 642 at path 2 of FE 606 is −5 degrees. The desired phase (relative to path 1 at FE 602) of signal 640 at path 1 of FE 606 is 20 degrees, and the desired phase (relative to path 1 at FE 602) of signal 642 at path 2 of FE 606 is 25 degrees. The actual phase (relative to path 1 at FE 602) of signal 640 at path 1 and signal 642 at path 2 is 20 degrees.

An error phase (e.g., from the error phases 660) can be equal to the actual phase (e.g., from the actual phases 662) relative to a path x (e.g., path 1 or path 2 in FIG. 6C) minus the desired phase (e.g., from the desired phases 650) relative to path x. The desired phase relative to path x can be found by subtracting the path input signal phase from the path x input signal phase. The input signals can be driven by beamforming with the desired phase relationship. The actual phase relative to path x can be found by subtracting the path output signal phase from the path x output signal phase. The path output signal phase and the path x output signal phase can be the product of cross-coupling summing, as previously described with respect to FIG. 6B.

The desired phases 650, actual phase contributions 652A-B, vector sum phases 652C, error phases 660, actual phases 662, and coupling phase 654 illustrated in FIGS. 6B and 6C are merely simplified/exaggerated and illustrative examples provided for explanation purposes. One of ordinary skill in the art will recognize that, in other examples, the desired phases 650, actual phase contributions 652A-B, vector sum phases 652C, error phases 660, actual phases 662, and/or coupling phase 654 can be different than shown in FIGS. 6B and 6C. Moreover, while coupling phase 654 for the FEs 602, 604, 606 are the same in FIGS. 6B and 6C, other examples can include different coupling phases for some or all of the FEs. As noted above, the coupling phase 654 is provided as a simplified, illustrative example for explanation purposes.

In some examples, to mitigate and/or eliminate/cancel the negative effects of the cross-coupling at an FE, such as the cross-coupling shown in FIGS. 5A-5B and 6B-6C, the beamforming weights used by a BF (e.g., 424, 500) can be adjusted to compensate for the cross-coupling effects. For example, cross-coupling coefficients representing the cross-coupling (e.g., the cross-coupling magnitude and/or phase) at an FE can be measured and/or calculated, and used to compensate the beamforming weights used by the BF. The BF can apply the compensated beamforming weights to the signals to mitigate and/or eliminate/cancel the effects of the cross-coupling at the FE. In some examples, the compensation for the cross-coupling effects can allow the signals (e.g., signals 632, 634, 636, 638, 640, 642) to the antenna elements (e.g., antenna elements 620, 622, 624, 626, 628, 630) to maintain and/or achieve the same phase relationship as the desired phases 650.

Figure 7A:
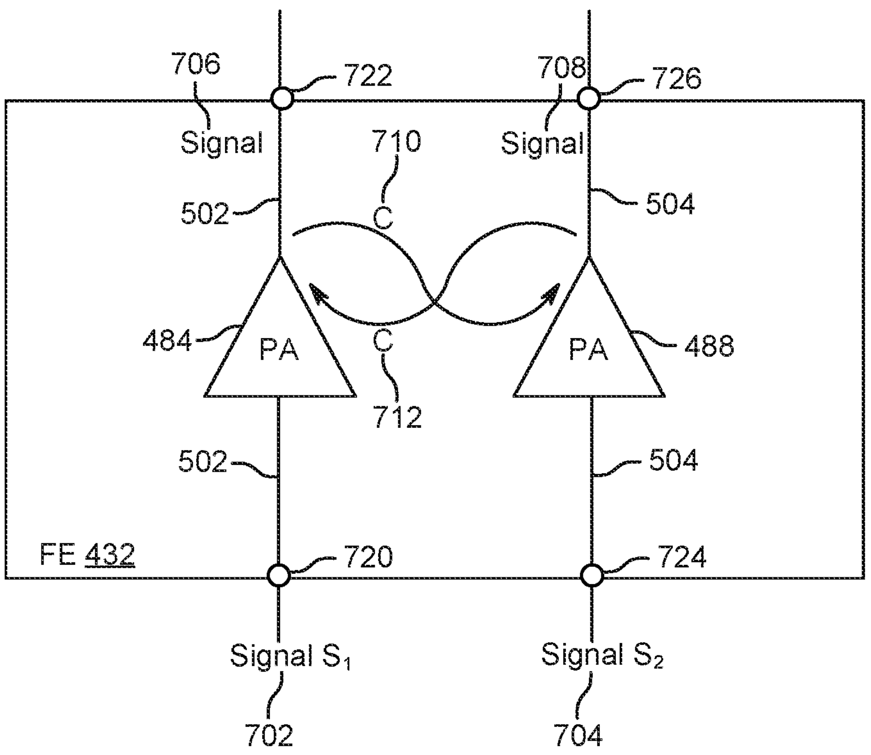
FIG. 7A is a diagram illustrating an example cross-coupling compensation for transmit signals, in accordance with some examples of the present disclosure.

FIG. 7A is a diagram illustrating an example cross-coupling compensation for Tx signals. In this example, signal 702 is the desired signal (e.g., the signal with the desired properties without being power-amplified) for antenna element 412A and signal 706 is the actual signal to the antenna element 412A. Moreover, signal 704 is the desired signal for antenna element 412B and signal 708 is the actual signal to the antenna element 412B.

Coupling coefficients 710, 712 can represent the total cross-coupling between signal paths 502 and 504 (as well as cross-coupling paths 520, 522, 524, 526 shown in FIG. 5A) at the FE 432. In some examples, the coupling coefficients 710, 712 can each include a coupling magnitude and phase calculated for one or more coupling sources at FE 432. In some cases, the coupling coefficients 710, 712 can be the same (e.g., coupling can be symmetrical). In other cases, the coupling coefficients 710, 712 can differ (e.g., coupling can be asymmetrical).

The coupling coefficients 710, 712 can be measured and/or estimated, and used to calculate beamforming weights for the desired signals which account for (e.g., mitigate and/or eliminate/cancel) the cross-coupling effects at the FE 432. The coupling coefficients 710, 712 can be derived from measured port-to-port gains. In some examples, the coupling coefficient 710 and the coupling coefficient 712 can be calculated as follows:

$$\text{Coupling coefficient 710} = \frac{S_{21'}}{S_{21}} \qquad \text{Equation (1)}$$

$$\text{Coupling coefficient 712} = \frac{S_{2'1}}{S_{2'1'}} \qquad \text{Equation (2)}$$

where $S_{21'}$ is the gain from input port 724 to output port 722 (e.g., input signal 704 to output signal 706), $S_{21}$ is the gain from input port 720 to output port 726 (e.g., input signal 702 to output signal 706), $S_{2'1}$ represents the gain from input port 720 to output port 726 (e.g., input signal 702 to output signal 708), and $S_{2'1'}$ represents the gain from input port 724 to output port 726 (e.g., input signal 704 to output signal 708). As illustrated in Equation (2), the coupling coefficient 712 can be calculated based on the forward gain from signal 704 to signal 706 and the forward gain from signal 702 to signal 706. Similarly, as illustrated in Equation (1), the coupling coefficient 710 can be calculated based on the forward gain from signal 702 to signal 708 and the forward gain from signal 704 to signal 708.

In some examples, the beamforming weights for the desired signals can be calculated using the coupling coefficients 710, 712 as follows:

$$\begin{pmatrix} 1 & C_x \\ C_y & 1 \end{pmatrix}^{-1} \begin{pmatrix} W_1 \\ W_2 \end{pmatrix} = \begin{pmatrix} W_1' \\ W_2' \end{pmatrix} \quad \text{Equation (3)}$$

Where $W_1$ and $W_2$ represent the desired beamforming weights (e.g., the weight relationship desired at the antennas) associated with signals 702 and 704, $W_{1'}$ and $W_{2'}$ represent the cross-coupling compensated weights to apply to the signals 702 and 704 to obtain the desired signals that account for the cross-coupling effects (e.g., mitigate and/or eliminate/cancel the cross-coupling effects) at FE 432, $C_x$ represents coupling coefficient 712, $C_y$ represents coupling coefficient 710, and $$\begin{pmatrix} 1 & C_x \\ C_y & 1 \end{pmatrix}^{-1}$$

is the inverse coupling matrix of the coupling matrix $$\begin{pmatrix} 1 & C_x \\ C_y & 1 \end{pmatrix}$$

representing the cross-coupling effects at FE 432.

Accordingly, the BF (e.g., DBF 424, BF 500) can respectively apply the calculated weights $W_{1'}$ and $W_{2'}$ to the signals 702 and 704 to generate the desired signals for the antennas (e.g., the signals intended to appear at the antennas). The input signals can be pre-compensated to cancel and/or mitigate the cross-coupling effects at the FE 432 so the desired signals (e.g., the signals with the desired phase, gain, amplitude, etc.) are received at the antenna elements 412A, 412B.

Figure 7B:
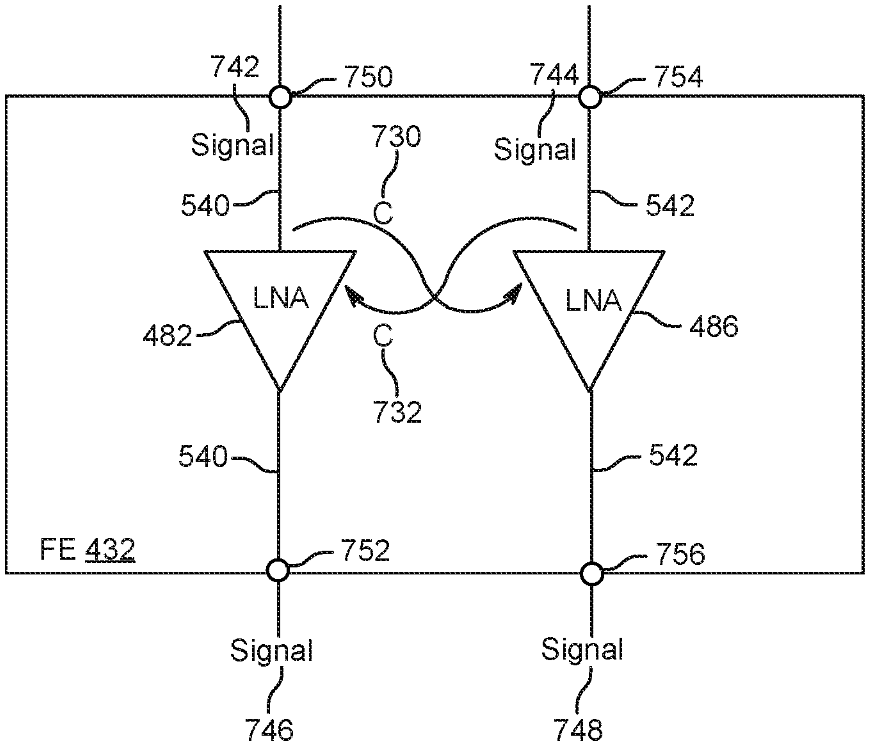
FIG. 7B is a diagram illustrating an example cross-coupling compensation for receive signals, in accordance with some examples of the present disclosure.

FIG. 7B is a diagram illustrating an example cross-coupling compensation for Rx signals. In this example, signal 742 is an Rx signal from antenna element 412A and signal 746 is the signal amplified by LNA 482 at the FE 432. Moreover, signal 744 is an Rx signal from antenna element 412B and signal 748 is the signal amplified by LNA 486.

Coupling coefficients 730, 732 can represent the total cross-coupling between signal paths 540 and 542 (as well as cross-coupling paths 520, 522, 524, 526 shown in FIG. 5A) at the FE 432. In some examples, the coupling coefficients 730, 732 can each include a coupling magnitude and phase calculated for one or more coupling sources at FE 432. In some cases, the coupling coefficients 730, 732 can be the same (e.g., coupling can be symmetrical). In other cases, the coupling coefficients 730, 732 can differ (e.g., coupling can be asymmetrical).

The coupling coefficients 730, 732 can be measured and/or estimated, and used to calculate beamforming weights for the desired signals (e.g., the desired signal properties/patterns) which account for (e.g., mitigate and/or eliminate/cancel) the cross-coupling effects at the FE 432. The coupling coefficients 730, 732 can be derived from measured port-to-port gains. In some examples, the coupling coefficient 730 and the coupling coefficient 732 can be calculated as follows:

$$\text{Coupling coefficient 730} = \frac{S_{21'}}{S_{21}} \quad \text{Equation (4)}$$

-continued $$\text{Coupling coefficient 732} = \frac{S_{2'1}}{S_{2'1'}} \quad \text{Equation (5)}$$

where $S_{21'}$ is the gain from port 754 to port 752 (e.g., input signal 744 to output signal 746), $S_{21}$ is the gain from port 750 to output port 752 (e.g., input signal 742 to output signal 746), $S_{2'1}$ represents the gain from port 750 to port 756 (e.g., input signal 742 to output signal 748), and $S_{2'1'}$ represents the gain from port 754 to port 756 (e.g., input signal 744 to output signal 748). As illustrated in Equation (5), the coupling coefficient 732 can be calculated based on the forward gain from signal 744 to signal 746 and the forward gain from signal 742 to signal 746. Similarly, as illustrated in Equation (4), the coupling coefficient 730 can be calculated based on the forward gain from signal 742 to signal 748 and the forward gain from signal 744 to signal 748.

In some examples, the beamforming weights for the desired signals can be calculated using the coupling coefficients 730, 732 as follows:

$$\begin{pmatrix} 1 & C_x \\ C_y & 1 \end{pmatrix}^{-1} \begin{pmatrix} W_1 \\ W_2 \end{pmatrix} = \begin{pmatrix} W_1' \\ W_2' \end{pmatrix} \quad \text{Equation (6)}$$

where $W_1$ and $W_2$ represent the desired beamforming weights associated with signals 742 and 744, $W_{1'}$ and $W_{2'}$ represent the cross-coupling compensated weights to apply to the signals 746 and 748 to obtain the desired signals that account for the cross-coupling effects (e.g., mitigate and/or eliminate/cancel the cross-coupling effects) at FE 432, $C_x$ represents coupling coefficient 732, $C_y$ represents coupling coefficient 730, and $$\begin{pmatrix} 1 & C_x \\ C_y & 1 \end{pmatrix}^{-1}$$

is the inverse coupling matrix of the coupling matrix $$\begin{pmatrix} 1 & C_x \\ C_y & 1 \end{pmatrix}$$

representing the cross-coupling effects at FE 432.

Accordingly, the BF (e.g., DBF 424, BF 500) can respectively apply the calculated weights $W_{1'}$ and $W_{2'}$ to the signals 746 and 748 to generate the desired Rx signals. The desired Rx signals can be compensated to cancel and/or mitigate the cross-coupling effects at the FE 432 so the desired signals (e.g., the signals with the desired phase, gain, amplitude, etc.) are produced by the BF.

Having disclosed example systems, components and concepts, the disclosure now turns to the example method 800 for cross-coupling modeling and compensation, as shown in FIG. 8. The steps outlined herein are non-limiting examples provided for illustration purposes, and can be implemented in any combination thereof, including combinations that exclude, add, or modify certain steps.

At block 802, the method 800 can include determining (e.g., measuring, simulating, and/or calculating) one or more cross-coupling coefficients (e.g., coupling coefficients 710, 712, 730, 732) representing electrical cross-coupling (e.g., coupling 520, 522, 524, 526 or 544, 546, 548, 550) within a component of a phased array antenna (e.g., phased array antenna system 420). In some examples, the component can include a frontend (e.g., FE 432, FE 506, FE 602, FE 604, FE 606). The frontend can include, for example, an IC, a module, a device, etc. Moreover, in some examples, the component can include one or more signal paths (e.g., signal paths 466, 468, 502, 504, 540, 542) between one or more beamformers (e.g., 424, 426, 500) of the phased array antenna and a set of antenna elements (e.g., 412, 414, 528, 620, 622, 624, 626, 628, 630) of the phased array antenna. The one or more beamformers can include digital and/or analog beamformers.

At block 804, the method 800 can include modifying, based on the one or more cross-coupling coefficients, one or more beamforming weights (e.g., weights $W_1$, $W_2$) calculated for one or more signals (e.g., signals 502, 504, 540, 542) routed via the one or more signal paths. In some examples, the one or more modified beamforming weights can compensate (e.g., mitigate and/or cancel) for the electrical cross-coupling within the component of the phased array antenna.

At block 806, the method 800 can include applying the one or more modified beamforming weights to the one or more signals routed via the one or more signal paths. The one or more modified beamforming weights applied to the one or more signals can pre-compensate the beamforming weights to mitigate and/or cancel the electrical cross-coupling effects within the component of the phased array antenna. In some cases, the one or more modified beamforming weights can be applied to the one or more signals via the one or more beamformers. In some cases, the one or more modified beamforming weights can be applied to the one or more signals via one or more other components such as, for example, the frontend (e.g., FE 432, FE 506, FE 602, FE 604, FE 606).

In some examples, the component can include a frontend (e.g., FE 432, FE 506, FE 602, FE 604, FE 606) that interfaces with the set of antenna elements and/or the one or more beamformers (e.g., BF 424, BF 456, BF 460, BF 500).

In some examples, determining the one or more cross-coupling coefficients can include determining a difference between the one or more signals and one or more reference signals (e.g., one or more desired or target signals) having one or more target signal properties (e.g., gain, phase, time delay, patterns, etc.); determining the one or more cross-coupling coefficients based on the difference between the one or more signals and one or more reference signals; and based on the one or more cross-coupling coefficients, determining a cross-coupling matrix associated with the component of the phased array antenna. In some cases, the difference can include a magnitude difference and/or a phase difference.

In some aspects, modifying the one or more beamforming weights calculated for one or more signals can include determining an inverse of the cross-coupling matrix and multiplying the one or more beamforming weights calculated for the one or more signals by the inverse of the cross-coupling matrix. In some examples, the cross-coupling coefficients and modified beamforming weights can be calculated based on Equations 1-3 or Equations 4-6, as previously explained.

In some examples, the one or more signal paths can include a first path (e.g., signal path 502 or 540) between the one or more beamformers and a first antenna element (e.g., antenna element 412A or antenna element 528A) of the set of antenna elements and a second path (e.g., signal path 504 or 542) between the one or more beamformers and a second antenna element (e.g., antenna element 412B or antenna element 528B) of the set of antenna elements, and the one or more cross-coupling coefficients can include a first cross-coupling coefficient (e.g., coupling coefficient 710 or 730) and a second cross-coupling coefficient (e.g., coupling coefficient 712 or 732) associated with the first path and the second path.

In some cases, the first cross-coupling coefficient can be determined based on a first gain from an input signal at the second path (e.g., signal 704) and an output signal at the first path (e.g., signal 706) divided by a second gain from an input signal at the first path (e.g., signal 702) and the output signal at the first path (e.g., signal 706), and the second cross-coupling coefficient can be calculated based on a third gain from the input signal at the first path (e.g., signal 702) and an output signal at the second path (e.g., signal 708) divided by a fourth gain from the input signal at the second path (e.g., signal 704) and the output signal at the second path (e.g., signal 708). In some cases, modifying the one or more beamforming weights calculated for one or more signals can include multiplying the one or more beamforming weights by an inverse of the first cross-coupling coefficient and the second cross-coupling coefficient.

In some examples, the component can include a set of amplifiers (e.g., amplifiers 482, 484, 486, 488, 508A, 508B, 528A, 528B), and the output signal at the first path can include a first amplified signal generated by a first amplifier (e.g., amplifier 482, 508A, or 528A) of the set of amplifiers based on the input signal at the first path and the output signal at the second path can include a second amplified signal generated by a second amplifier (e.g., amplifier 486, 508B, or 528B) of the set of amplifiers based on the input signal at the second path.

In some examples, the one or more beamforming weights can include a respective gain, a respective phase-shift, and/or a respective time delay calculated for the one or more signals based on one or more target signal properties (e.g., gain, phase, time delay, etc.).

In some examples, the method 800 may be performed by one or more computing devices or apparatuses. In one illustrative example, the method can be performed by a user terminal or SAT shown in FIG. 1A and/or one or more computing devices with the computing device architecture 900 shown in FIG. 9. In some cases, such a computing device or apparatus may include a processor, microprocessor, microcomputer, or other component of a device that is configured to carry out the steps of the method 800. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 800 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement various techniques described herein. For example, the computing device architecture 900 can be used to implement at least some portions of the SATs 102, the SAGs 104, the user terminals 112 and/or the user network devices 114 shown in FIG. 1A, and perform at least some cross-coupling modeling and/or compensation operations described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include software, code, firmware, etc., for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein

What is claimed is:

1. A method comprising:

determining one or more cross-coupling coefficients representing an electrical cross-coupling between a first signal path through a component of a phased array antenna and a second signal path through the component of the phased array antenna, wherein a first beamforming weight is determined for a first signal associated with the first signal path and wherein a second beamforming weight is determined for a second signal associated with the second signal path, and wherein a gain and/or phase relationship between the first beamforming weight and the second beamforming weight is determined based on a beam steering direction for the phased array antenna;

based on the one or more cross-coupling coefficients, determining a first modified beamforming weight for the first signal associated with the first signal path through the component and a second modified beamforming weight for the second signal associated with the second signal path through the component, wherein the first modified beamforming weight modifies the first beamforming weight based on the one or more cross-coupling coefficients and the second modified beamforming weight modifies the second beamforming weight based on the one or more cross-coupling coefficient;

applying the first modified beamforming weight to the first signal associated with the first signal path; and applying the second modified beamforming weight to the second signal associated with the second signal path.

2. The method of claim 1, wherein the component comprises a first amplifier configured to apply a first gain to the first signal routed through the first signal path of the component and a second amplifier configured to apply a second gain to the second signal routed through the second signal path of the component.

3. The method of claim 1, wherein the component comprises a first phase shifter configured to apply a first phase shift to the first signal routed through the first signal path of the component and a second phase shifter configured to apply a second phase shift to the second signal routed through the second signal path of the component.

4. The method of claim 3, wherein applying the first modified beamforming weight includes applying a first modified phase shift by the first phase shifter and applying the second modified beamforming weight includes applying a second modified phase shift by the second phase shifter.

5. The method of claim 1, wherein determining the one or more cross-coupling coefficients comprises:

determining a first difference between the first signal and a first reference signal having one or more target signal properties, wherein the first difference comprises at least one or more of a first magnitude difference or a first phase difference;

determining a second difference between the second signal and a second reference signal having one or more target signal properties, wherein the second difference comprises at least one or more of a second magnitude difference or a second phase difference;

determining the one or more cross-coupling coefficients based on at least one or more of the first difference or the second difference; and based on the one or more cross-coupling coefficients, determining a cross-coupling matrix associated with the component of the phased array antenna.

6. The method of claim 5, wherein determining the first modified beamforming weight and the second modified beamforming weight comprises:

determining an inverse of the cross-coupling matrix;

multiplying the first beamforming weight by the inverse of the cross-coupling matrix to generate the first modified beamforming weight; and multiplying the second beamforming weight by the inverse of the cross-coupling matrix to generate a second modified beamforming weight.

7. The method of claim 6, wherein the one or more cross-coupling coefficients comprise a first cross-coupling coefficient and a second cross-coupling coefficient associated with the first signal path and the second signal path, respectively.

8. The method of claim 7, wherein the first cross-coupling coefficient is calculated based on a first gain from an input signal at the second signal path and an output signal at the first signal path divided by a second gain from an input signal at the first signal path and the output signal at the first signal path, and wherein the second cross-coupling coefficient is calculated based on a third gain from the input signal at the first signal path and an output signal at the second signal path divided by a fourth gain from the input signal at the second signal path and the output signal at the second signal path.

9. The method of claim 8, wherein the component comprises a set of amplifiers, wherein the output signal at the first signal path comprises a first amplified signal generated by a first amplifier of the set of amplifiers based on a first input signal at the first signal path, and wherein the output signal at the second signal path comprises a second amplified signal generated by a second amplifier of the set of amplifiers based on a second input signal at the second signal path.

10. The method of claim 8, wherein:

modifying the first beamforming weight calculated for the first signal comprises multiplying the first beamforming weight by an inverse of the first cross-coupling coefficient and the second cross-coupling coefficient; and modifying the second beamforming weight calculated for the second signal comprises multiplying the second beamforming weight by the inverse of the first cross-coupling coefficient and the second cross-coupling coefficient.

11. The method of claim 1, wherein the first and second modified beamforming weights comprise at least one or more of a respective gain, a respective phase-shift, or a respective time delay calculated for the first signal and the second signal based on one or more target signal properties.

12. A phased array antenna system comprising:

a plurality of antenna elements;

a component comprising a first signal path through the component associated with a first signal and a second signal path of the component associated with a second signal, wherein the second signal is different from the first signal, wherein a first beamforming weight is determined for the first signal associated a second beamforming weight is determined for the second signal, and wherein a gain and/or phase relationship between the first beamforming weight and the second beamforming weight is determined based on a beam steering direction;

one or more first beamforming components configured to apply a first modified beamforming weight to the first signal, wherein the first modified beamforming weight is based on the first beamforming weight and a first beamforming weight compensation based on an electrical cross-coupling between the first signal path and the second signal path; and one or more second beamforming components configured to apply a second modified beamforming weight to the second signal; wherein the second modified beamforming weight is based on the second beamforming weight and a second beamforming weight compensation based on the electrical cross-coupling between the first signal path and the second signal path.

13. The phased array antenna system of claim 12, wherein the component comprises a first amplifier configured to apply a first gain to the first signal routed through the first signal path of the component and a second amplifier configured to apply a second gain to the second signal routed through the second signal path of the component.

14. The phased array antenna system of claim 12, wherein the component comprises a first phase shifter configured to apply a first phase shift to the first signal routed through the first signal path of the component and a second phase shifter configured to apply a second phase shift to the second signal routed through the second signal path of the component.

15. The phased array antenna system of claim 14, wherein applying the first modified beamforming weight includes applying a first phase shift by the first phase shifter and applying the second modified beamforming weight includes applying a second phase shift by the second phase shifter.

16. The phased array antenna system of claim 12, further comprising:

determining a first difference between the first signal and a first reference signal having one or more target signal properties, wherein the first difference comprises at least one or more of a first magnitude difference or a first phase difference;

determining a second difference between the second signal and a second reference signal having one or more target signal properties, wherein the second difference comprises at least one or more of a second magnitude difference or a second phase difference;

determining one or more cross-coupling coefficients based on at least one or more of the first difference or the second difference; and based on the one or more cross-coupling coefficients, determining a cross-coupling matrix associated with the component.

17. The phased array antenna system of claim 16, wherein determining the first modified beamforming weight and the second modified beamforming weight comprises:

determining an inverse of the cross-coupling matrix;

multiplying the first beamforming weight by the inverse of the cross-coupling matrix to generate the first modified beamforming weight; and multiplying the second beamforming weight by the inverse of the cross-coupling matrix to generate the second modified beamforming weight.

18. The phased array antenna system of claim 17, wherein the one or more cross-coupling coefficients comprise a first cross-coupling coefficient and a second cross-coupling coefficient associated with the first signal path and the second signal path, respectively.

19. The phased array antenna system of claim 18, wherein the first cross-coupling coefficient is calculated based on a first gain from an input signal at the second signal path and an output signal at the first signal path divided by a second gain from an input signal at the first signal path and the output signal at the first signal path, and wherein the second cross-coupling coefficient is calculated based on a third gain from the input signal at the first signal path and an output signal at the second signal path divided by a fourth gain from the input signal at the second signal path and the output signal at the second signal path.

20. The phased array antenna system of claim 19, wherein the component comprises a set of amplifiers, wherein the output signal at the first signal path comprises a first amplified signal generated by a first amplifier of the set of amplifiers based on a first input signal at the first signal path, and wherein the output signal at the second signal path comprises a second amplified signal generated by a second amplifier of the set of amplifiers based on a second input signal at the second signal path.

21. The phased array antenna system of claim 19, wherein:

modifying the first beamforming weight calculated for the first signal comprises multiplying the first beamforming weight by an inverse of the first cross-coupling coefficient and the second cross-coupling coefficient; and modifying the second beamforming weight calculated for the second signal comprises multiplying the second beamforming weight by the inverse of the first cross-coupling coefficient and the second cross-coupling coefficient.

22. The phased array antenna system of claim 12, wherein the first and second modified beamforming weights comprise at least one or more of a respective gain, a respective phase-shift, or a respective time delay calculated for the first signal and the second signal based on one or more target signal properties.

* * * * *